United States Patent
Marino et al.

(10) Patent No.: US 9,154,327 B1
(45) Date of Patent: Oct. 6, 2015

(54) USER-CONFIGURED ON-DEMAND VIRTUAL LAYER-2 NETWORK FOR INFRASTRUCTURE-AS-A-SERVICE (IAAS) ON A HYBRID CLOUD NETWORK

(75) Inventors: Christopher C. Marino, Mill Valley, CA (US); Juergen Brendel, Auckland (NZ); Patrick Amor, Menlo Park, CA (US); Pritesh Kothari, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 851 days.

(21) Appl. No.: 13/117,986

(22) Filed: May 27, 2011

(51) Int. Cl.
G06Q 30/04 (2012.01)
H04L 12/46 (2006.01)
H04L 12/741 (2013.01)
H04L 29/06 (2006.01)

(52) U.S. Cl.
CPC ............ *H04L 12/4641* (2013.01); *G06Q 30/04* (2013.01); *H04L 45/74* (2013.01); *H04L 69/22* (2013.01)

(58) Field of Classification Search
CPC ..... G06Q 30/04; G06Q 50/06; G06Q 20/145; G06Q 20/102; G06Q 20/14
USPC .......................................................... 705/34
See application file for complete search history.

(56) References Cited

U.S. PATENT DOCUMENTS

| | | | |
|---|---|---|---|
| 5,825,772 A | 10/1998 | Dobbins et al. | |
| 5,892,912 A | 4/1999 | Suzuki et al. | |
| 6,438,612 B1 | 8/2002 | Ylonen et al. | |
| 6,493,349 B1 | 12/2002 | Casey | |
| 6,711,152 B1 | 3/2004 | Kalmanek, Jr. et al. | |
| 7,088,714 B2 | 8/2006 | Athreya et al. | |
| 7,113,498 B2 | 9/2006 | Bajic | |
| 7,154,861 B1 | 12/2006 | Merchant et al. | |
| 7,209,976 B2 | 4/2007 | Folkes et al. | |
| 7,242,665 B2 | 7/2007 | Langille et al. | |
| 7,272,643 B1 | 9/2007 | Sarkar et al. | |
| 7,296,092 B2 | 11/2007 | Nguyen | |
| 7,352,745 B2 | 4/2008 | Perera et al. | |

(Continued)

OTHER PUBLICATIONS

Pan, Jianli. Next generation internet architecture and cyber-assisted energy efficiency in smart grids of buildings. Washington University in St. Louis, ProQuest, UMI Dissertations Publishing, 2014.*

(Continued)

*Primary Examiner* — Ryan Zeender
*Assistant Examiner* — Fawaad Haider

(57) ABSTRACT

A virtual network is overlaid upon physical networks. The virtual network is a layer-2 network that appears to expand an organization's LAN using virtual MAC addresses. A VN device driver shim intercepts LAN packets and their virtual MAC and IP addresses and encapsulates them with physical packets that can be routed over the Internet. As new nodes are created, a VN switch table is expanded so that all nodes on the virtual network can reach the new node. A copy of the VN switch table is stored on each node by a virtual network management daemon on the node. A VN configuration controller in a central server updates the VN switch tables. Organizations can expand their virtual network as nodes are created at remote cloud computing providers without action by the staff at the cloud computing provider. Hybrid cloud virtual networks include on-premises physical and virtual-machine nodes, and off-premises guest nodes and instances.

21 Claims, 16 Drawing Sheets

(56) References Cited

U.S. PATENT DOCUMENTS

| | | | |
|---|---|---|---|
| 7,478,167 B2 | 1/2009 | Ould-Brahim et al. |
| 7,486,659 B1 | 2/2009 | Unbehagen et al. |
| 7,606,939 B1 | 10/2009 | Finn |
| 7,617,327 B1 | 11/2009 | Allam et al. |
| 7,634,608 B2 | 12/2009 | Droux et al. |
| 7,730,210 B2 | 6/2010 | Kuik et al. |
| 7,733,795 B2 | 6/2010 | Johnson et al. |
| 7,733,802 B2 | 6/2010 | Ho et al. |
| 7,802,000 B1 | 9/2010 | Huang et al. |
| 7,835,367 B2 | 11/2010 | Shimada |
| 7,843,907 B1 * | 11/2010 | Abou-Emara et al. | 370/386 |
| 7,894,451 B2 | 2/2011 | Parker et al. |
| 7,948,994 B2 | 5/2011 | Shen |
| 8,660,129 B1 | 2/2014 | Brendel et al. |
| 2002/0152373 A1 | 10/2002 | Sun et al. |
| 2003/0037165 A1 | 2/2003 | Shinomiya |
| 2004/0085965 A1 | 5/2004 | Fotedar |
| 2004/0243705 A1 | 12/2004 | Netravali et al. |
| 2005/0066035 A1 | 3/2005 | Williams et al. |
| 2005/0281249 A1 | 12/2005 | Chander et al. |
| 2006/0045089 A1 | 3/2006 | Bacher et al. |
| 2006/0155708 A1 | 7/2006 | Brown et al. |
| 2006/0206300 A1 | 9/2006 | Garg et al. |
| 2006/0233168 A1 | 10/2006 | Lewites et al. |
| 2007/0280243 A1 | 12/2007 | Wray et al. |
| 2009/0046726 A1 | 2/2009 | Cabrera et al. |
| 2011/0075674 A1 | 3/2011 | Li et al. |
| 2011/0307289 A1 * | 12/2011 | Hosur et al. | 705/7.23 |
| 2014/0126418 A1 | 5/2014 | Brendel et al. |

OTHER PUBLICATIONS

Amazon Web Services, "Extend Your IT Infrastructure with Amazon Virtual Private Cloud", Jan. 2010, pp. 1-6.

Openvpn Technologies, "OpenVPN Access Server" Datasheet, Jun. 2, 2010, pp. 1-2.

* cited by examiner

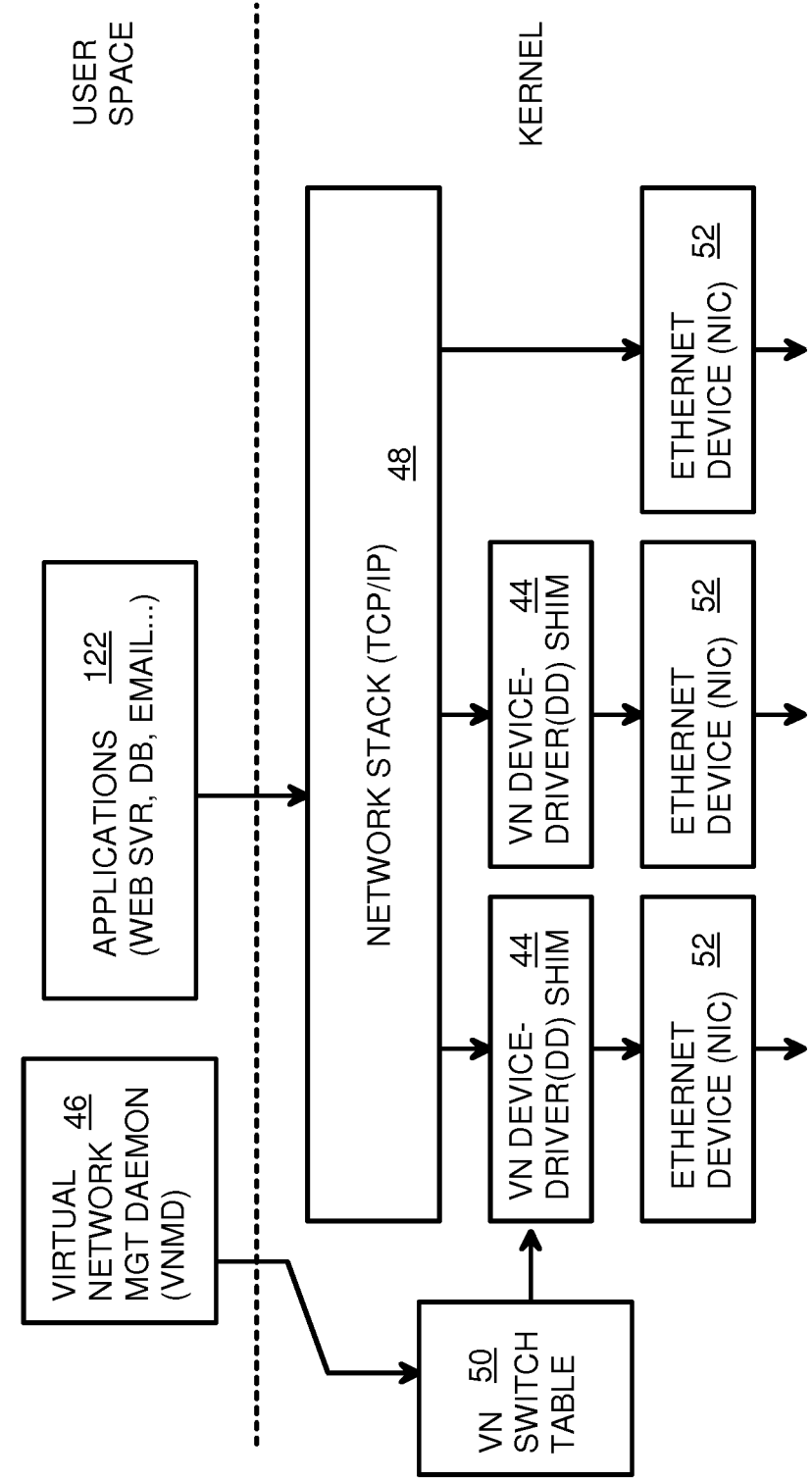

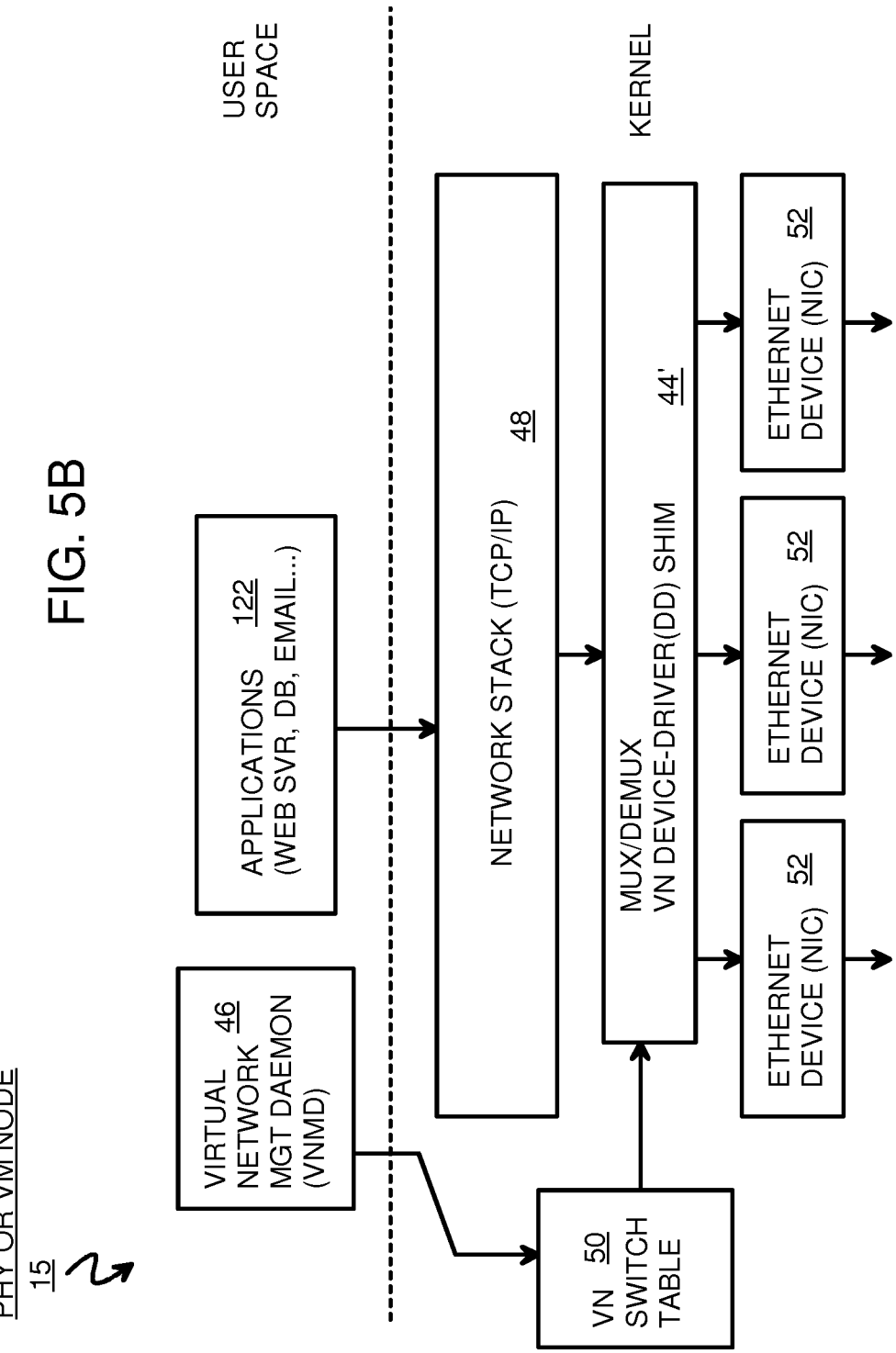

FIG. 10

VN SWITCH TABLE 50

| VN ID | NODE ID | VIRTUAL IP | VIRTUAL MAC | DEST. PHY IP:PORT | ENCRYPT. KEY |
|---|---|---|---|---|---|
| VN1 | NODE 1 | 10.1.1.1 | 11:22:33:44:55:66 | 207.1.2.3:8002 | 7AB30445FF |
| VN1 | NODE 2 | 10.1.1.3 | 43:79:88:00:15:82 | 72.45.1.2:8002 | C04F45DF71 |
| VN1 | NODE 3 | 10.1.1.5 | 14:79:81:00:15:55 | 72.45.1.5:8002 | FF4F45D333 |
| ... | ... | ... | ... | ... | ... |
| VN1 | NODE 9 | 10.1.1.13 | 33:79:38:00:15:89 | 192.1.1.13:8002 | C04F45DF71 |
| VN2 | NODE 1 | 10.3.2.1 | 33:79:38:00:15:89 | 207.1.2.3:8002 | 7AB30445FF |
| ... | ... | ... | ... | ... | ... |
| VN2 | NODE 9 | 10.1.2.13 | 63:79:38:05:15:84 | 192.6.1.13:8002 | 123445DF7B |

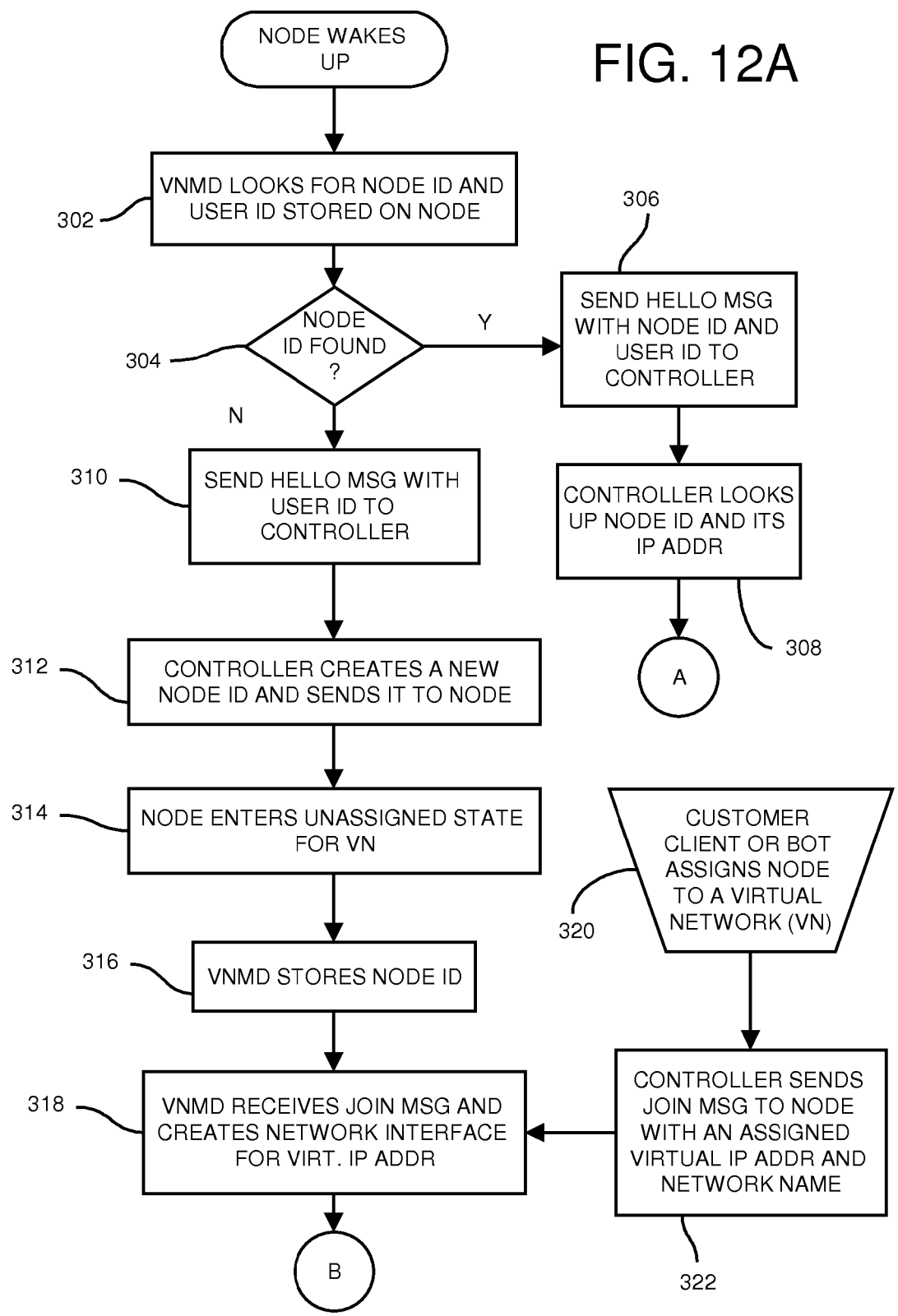

USER-CONFIGURED ON-DEMAND VIRTUAL LAYER-2 NETWORK FOR INFRASTRUCTURE-AS-A-SERVICE (IAAS) ON A HYBRID CLOUD NETWORK

FIELD OF THE INVENTION

This invention relates to Internet cloud services, and more particularly to user-configurable networking for hybrid cloud-computing systems.

BACKGROUND OF THE INVENTION

Organizations may host their websites and other applications using their own servers in data centers located on the organizations' property. Such on-premises servers allow the organizations strict control of their infrastructure. Unfortunately, a surge of user demand might overwhelm an organization's dedicated servers, causing their applications to be unavailable or even to crash. Organizations would have to purchase enough servers to meet this demand surge or risk losing customers and developing a bad online reputation.

Organizations could also purchase or rent servers from an outsourced infrastructure provider, perhaps to reduce costs. The infrastructure provider might host servers for many different organizations. Additional servers could be made available for use by an organization experiencing heavy demand. Since different organizations experience demand surges at different times, spare servers could be shared to provide surge capacity for many different organizations, spreading the cost of the spare servers over all of the organizations. Costs can be lowered by using off-premises servers, but organizations do lose some direct control compared with dedicated on-premises servers.

Rather than have physical servers dedicated to one of their customers (a subscribing organization, or simply a subscriber), an infrastructure provider might choose to offer virtual servers to their subscribers. A virtualization host (vHost), or hypervisor, controlled by the staff of the infrastructure provider allows subscribers to set up many virtual machine instances (VMs) on a single physical server. The number of virtual machines in use by a subscriber can vary over time as demand fluctuates. Virtual machines can even migrate or move from one vHost (i.e. physical server) to another using a process known as guest migration. One example of guest migration is vMotion by VMware.

There are a number of these outsourced infrastructure service providers that offer these kinds of cloud computing services to their subscribers. Cloud computing provides convenient, on-demand access to a shared pool of configurable computing resources (networks, servers, storage, applications, and services) that can be rapidly provisioned and released with minimal management effort or service-provider interaction. Using various software tools, a subscriber can provision resources from the shared pool automatically without action by the staff of the cloud computing provider. The cloud computing resources are pooled and shared among all subscribers with resources dynamically re-assigned according to end-user demand. Resources are often located in many different remote geographical locations.

The cloud computing resources can be rapidly provisioned to meet demand surges, allowing the subscribers' resources to be scaled up and down as demand fluctuates. Such resource usage is monitored and reported so that subscribers may be billed only for actual usage.

Software as a Service (SaaS) is an application delivery model that enables organizations to subscribe to software application services running at the SaaS provider. These SaaS applications can be accessed across the Internet through web browsers or other clients. The subscriber does not control the underlying servers, storage, network, or operating systems. Some outsourced infrastructure providers such as those that offer on-demand cloud computing services have built infrastructure control applications and application program interfaces (APIs) that enable subscribers to interact with their infrastructure in a manner similar to that of SaaS applications. These kinds of outsourced infrastructure providers are often referred to as an Infrastructure as a Service (IaaS) provider. Examples of IaaS providers include Amazon, Linode, and Rackspace, and examples of their products include Amazon's Web Services Elastic Compute Cloud (EC2), Linode, and Rackspace Cloud Hosting.

Many organizations, as they begin to take advantage of IaaS offerings, may use a hybrid approach. The organization may have company-owned on-premises servers and also subscribe to one or more cloud computing IaaS providers. The organization may use a combination of physical and virtual servers, both on-premises and off-premises.

Data may need to be transferred between on-premises servers and off-premises servers. These servers could be either physical or virtual. Such hybrid clouds pose various challenges, especially for networking, since the cloud service provider still controls their underlying hardware infrastructure such as the servers and networks. The subscriber does not control the underlying hardware or networks at the cloud service provider.

FIG. 1 shows a prior-art hybrid cloud network. An organization such as a company that has a web site or application that they wish to deploy in the cloud, has company-owned servers located on company property at on-premises location 104. The on-premises servers can include some dedicated servers that are physical machines, such as physical node 12, and other dedicated servers that run a virtualization host (vHost or hypervisor) software, such as VMWare or Xen, originally developed by the University of Cambridge Computer Laboratory. The virtualization host software runs several virtual-machine nodes, VM nodes 14, which can each run applications to service client requests from Internet 100.

The organization also rents dedicated physical servers at hosted-server location 106 to run applications that service user requests from Internet 100. These servers include hosted physical nodes 13, which can be hosted by hosted server providers such as RackSpace. Other services could be provided by hosted-server location 106 such as cloud services (not shown) or co-location servers that are owned by the organization, not the provider.

The organization also subscribes to an IaaS provider which offers cloud computing resources from cloud-computing provider 108. Cloud-computing provider 108 could be EC2 or Rackspace Cloud, Linode, Slicehost, Terramark or any other similar IaaS provider. Cloud-computing provider 108 provides cloud services on-demand by running IaaS software that allows subscribers to automatically provision virtual machines instances such as VM nodes 14.

Client applications such as web browsers of remote users from Internet 100 can access the nodes that are configured as webservers, while the rest of the nodes can communicate with each other to process application data or serve database requests as needed. For example, a webserver application running on VM node 14 on cloud-computing provider 108 may need to communicate with a database application running on VM node 14 at on-premises location 104. Another webserver application running on hosted physical node 13 at hosted-server location 106 may also need to communicate with a database application running on physical node 12 at on-premises location 104.

IP Packets are sent over Internet 100 using Internet Protocol (IP) addresses and layer-3 routing of IP packets. Routers 22 transfer packets to and from local networks at on-premises location 104, hosted-server location 106, and cloud-computing provider 108. These local networks are usually layer-2 Ethernet networks that use Media-Access-Controller (MAC) addresses, sometimes referred to as Ethernet addresses. For example, layer-2 physical network 20 is a Local-Area-Network (LAN) that connects network interface controllers (NIC) 18 and router 22. The virtualization host may provision virtual NIC VNIC 16 for each virtual machine VM node 14, and connect each VNIC 16 to a physical NIC 18 for the virtual servers.

Cloud-computing provider 108 may have internal network 102 that uses router 22 to connect its own systems and possibly other datacenters to Internet 100. Internal network 102 could be a combination of wide area network (WAN) links connecting geographically distributed datacenters as well as LANs. Internal network 102 also includes the physical NICs on the IaaS host (not shown) that are necessary to connect VNIC 16 for instances of VM nodes 14 running on the IaaS host to an internal LAN connected to router 22 and provide access to Internet 100. Internal network 102 could be part of the IaaS provider's own network or even part of a different network provider's network for wide area connectivity such as Level 3 or AT&T.

The implementation details of internal network 102 are unknown to subscribers and therefore could use any combination of layer 3 routing and layer 2 switching technologies. Subscribers to cloud service provider 108 have no control over internal network 102 and therefore cannot change the configuration in any way.

Sometimes data needs to be transferred among servers at different locations. For example, an organization may keep its customer database secure at on-premises location 104 and only allow queries into the database from applications running on external servers such as at hosted-server location 106 or cloud-computing provider 108. Data may need to be transferred from physical node 12 to hosted physical node 13. A dedicated trunk connection may not be cost effective or practical between on-premises location 104 and hosted-server location 106, so a virtual-private-network (VPN) can be established through Internet 100.

VPN tunnel 24 connects physical node 12 to hosted physical node 13 by establishing a tunnel through Internet 100. Application software running on physical node 12 sends a message to hosted physical node 13 using a virtual IP address for hosted physical node 13. VPN software encrypts and packages the message and translates the virtual IP address to a physical IP address of NIC 18 on hosted physical node 13. VPN software on hosted physical node 13 translates the physical IP addresses to virtual IP addresses and decrypts the message. VPN tunnel 24 can also send messages in the reverse direction by a similar process.

While effective, VPN tunnel 24 only connects two nodes in a point-to-point manner. Separate VPN tunnels need to be set up for each pair of nodes. Thus a large number of VPN tunnels 24, 25 may need to be configured, one for each pair of nodes. This configuration may be manual and time-consuming.

As additional instances of VM nodes 14 on cloud-computing provider 108 are created, additional VPN tunnels 25 may need to be set up manually if applications running on VM nodes 14 need to query databases on physical node 12 at on-premises location 104, as well as to every other node with which it needs to communicate. Each VPN tunnel 25 connects a VNIC 16 for one of VM nodes 14 to NIC 18 of physical node 12.

The administrative burden of creating these VPN tunnels causes some organizations to introduce a dedicated VPN gateway device whereby each node connects only to the gateway device, thereby simplifying VPN creation. However, this gateway device introduces additional latency as well as a potential performance bottleneck since the gateway needs to process all packets from all nodes. The hub and spoke topology required for these kinds of VPN tunnels precludes the use of specific network topologies that may be required for certain multi-tiered application deployment.

Even without a gateway device, fully meshed VPNs can sometimes impact performance. VPN software is often simply a user-level application which needs to translate individual network packets and encrypt data, which can easily slow a system down.

Ideally, rather than use layer-3 IP routing through VPN tunnels 24, 25, additional VM nodes 14 on cloud-computing provider 108 and at hosted server location 106 would appear to be on virtualized layer-2 network at on-premises location 104. Switching over layer-2 physical network 20 is performed by MAC (or Ethernet) addresses at layer-2, rather than IP addresses at layer-3.

It would thus be desirable for connections to VM nodes 14 on cloud-computing provider 108 and at hosted server location 106 to be virtualized to appear on a virtualized layer-2 network that includes layer-2 physical network 20 at on-premises location 104. This is more desirable than networking using only VPN tunnels, which are hard to maintain, restrict network topologies, and often introduce performance bottlenecks.

IEEE 802.1Q is a virtualized LAN standard known as a VLAN. A VLAN uses extra tag bits in the Ethernet header to specify a portion of a LAN as a sub-network segment. Thus a VLAN merely divides an existing LAN into smaller virtual LANs that are separate from one another and define their own 'broadcast domain'. Separating LANs into smaller VLANs can improve LAN performance since certain kinds of traffic can be contained within a single broadcast domain.

What is desired is a virtual layer-2 network that connects remote nodes on a remote physical LAN to an on-premises LAN. A virtual network that switches at layer-2 using Ethernet addresses yet virtualizes remote nodes using virtual Ethernet addresses is desirable. Virtual layer-2 networking software for use by a cloud computing subscriber is desired to extend Infrastructure as a Service (IaaS) to virtual layer-2 networks. This allows a subscriber to configure their own layer-2 network. An IaaS user-configurable virtual network is desirable for virtual layer-2 switching.

BRIEF DESCRIPTION OF THE DRAWINGS

FIGS. 5A-B show virtual-networking daemons and shims added to each node on the virtual network.

FIG. 10 shows entries in a VN switch table.

FIGS. 12A-B show a flowchart of adding a new node to a virtual network.

DETAILED DESCRIPTION

The present invention relates to an improvement in Infrastructure as a Service (IaaS) virtual networking. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
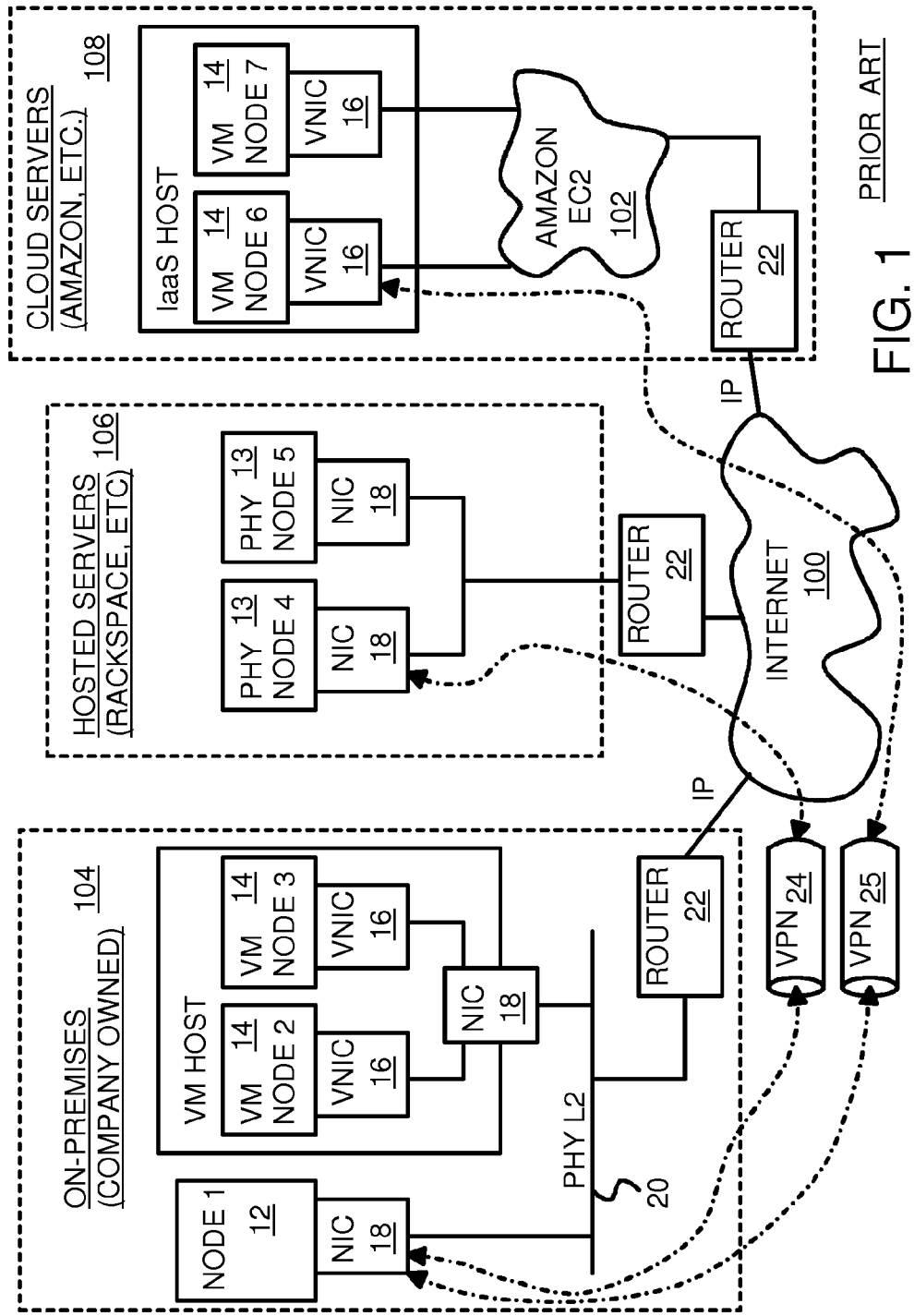
FIG. 1 shows a prior-art hybrid cloud network.
Figure 2:
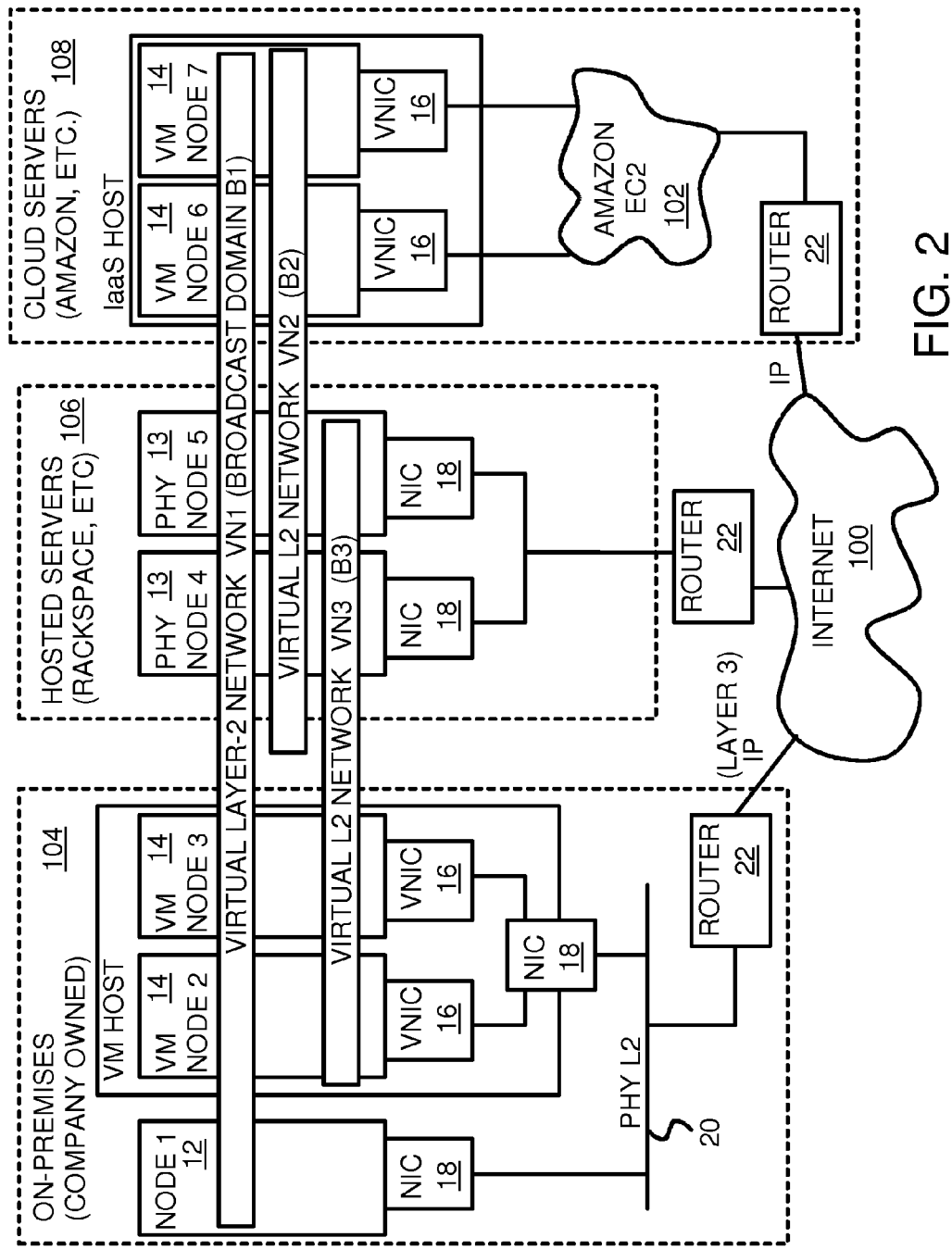
FIG. 2 shows a hybrid cloud network with overlaid user-configurable virtual layer-2 networks.

FIG. 2 shows a hybrid cloud network with overlaid user-configurable virtual layer-2 networks. Virtual networks VN1, VN2, and VN3 are overlaid on top of the physical layer-3 (IP) and layer-2 LAN (Ethernet) networks that physically connect on-premises location 104, hosted-server location 106, and cloud-computing provider 108. Virtual networks VN1, VN2, and VN3 are isolated from each other, yet use the same underlying physical networks.

Virtual networks VN1, VN2, and VN3 are layer-2 networks, using virtual Ethernet addresses to identify nodes on the virtual network. Since virtual networks VN1, VN2, and VN3 are isolated from each other, they each can use their own independent IP and Ethernet addresses ranges. This means that the same virtual IP and Ethernet addresses can exist on two different VNs without conflict, since the virtual IP and MAC addresses are specific only to one virtual network.

Virtual network VN1 connects physical node 12 and VM nodes 14 on on-premises location 104 to VM nodes 14 on cloud-computing provider 108. An organization could use this virtual network VN1 to run applications that can access an internal database on physical node 12, such as for remote employees and other trusted end-users.

Virtual network VN2 connects hosted physical nodes 13 on hosted-server location 106 to VM nodes 14 on cloud-computing provider 108. VN2 does not allow remote applications on VN2 to access physical node 12 on on-premises location 104. An organization could use this second virtual network VN2 to run applications that cannot access an internal database on physical node 12, such as for the general public accessing a company web site, or other un-trusted end-users.

Virtual network VN3 connects hosted physical nodes 13 at hosted-server location 106 and VM nodes 14 on on-premises location 104 but not VM nodes 14 on cloud-computing provider 108. An organization could use this third virtual network VN3 to run applications that can access another, less secure internal database on VM nodes 14, such as for the general public querying a database of products and prices that is kept on VM nodes 14 on on-premises location 104.

Each of virtual networks VN1, VN2, and VN3 has a different group of virtual Ethernet addresses within that network's broadcast domain. The same virtual Ethernet (or virtual IP) address could exist on two virtual networks, such as by being part of broadcast domain B1 of VN1 and broadcast domain B2 of VN2. Virtual networking software isolates each virtual network from other virtual networks.

Other organizations (not shown) could have other virtual networks that also use servers at hosted-server location 106 and cloud-computing provider 108, along with company servers at their own, different on-premises location (not shown). These virtual networks are kept isolated and independent of other virtual networks by virtual networking control software.

Special virtual-network configuration software is used to manage and control each VN. Providers of this configuration software can make it available to subscribers offering it as a compliment to their existing on-premises networks, rented physical servers, and cloud computing provider subscriptions. This virtual-network configuration and management service is itself an Infrastructure as a Service offering. Unlike Amazon's EC2 IaaS offering, this virtual network IaaS need not provide compute or storage resources, only network infrastructure configuration and management services on demand.

Organizations can subscribe to this virtual network offering, and configure and manage their own virtual networks using special virtual-network configuration software. A subscriber organization can add or remove nodes on a virtual network without help by the staff at cloud-computing provider 108 or hosted-server location 106. Thus the subscribers have control over their own virtual networks. The virtual layer-2 networks become another resource that is user-configurable and metered that can be provided by an independent Virtual Network Infrastructure as a Service (VN IaaS) provider or as a virtual network subscription offering made available by cloud-computing provider 108.

IT staff at on-premises location 104 now has control over the virtual network that connects all of their systems, without requiring control over the network that the external systems are physically attached to.

When one of the instances of VM nodes 14 moves from one physical server (virtualization host) to another at cloud-computing provider 108, such as when node migration occurs due to guest migration, the virtual-network configuration and network policies may move with the instance or guest as its is moved.

Figure 3:
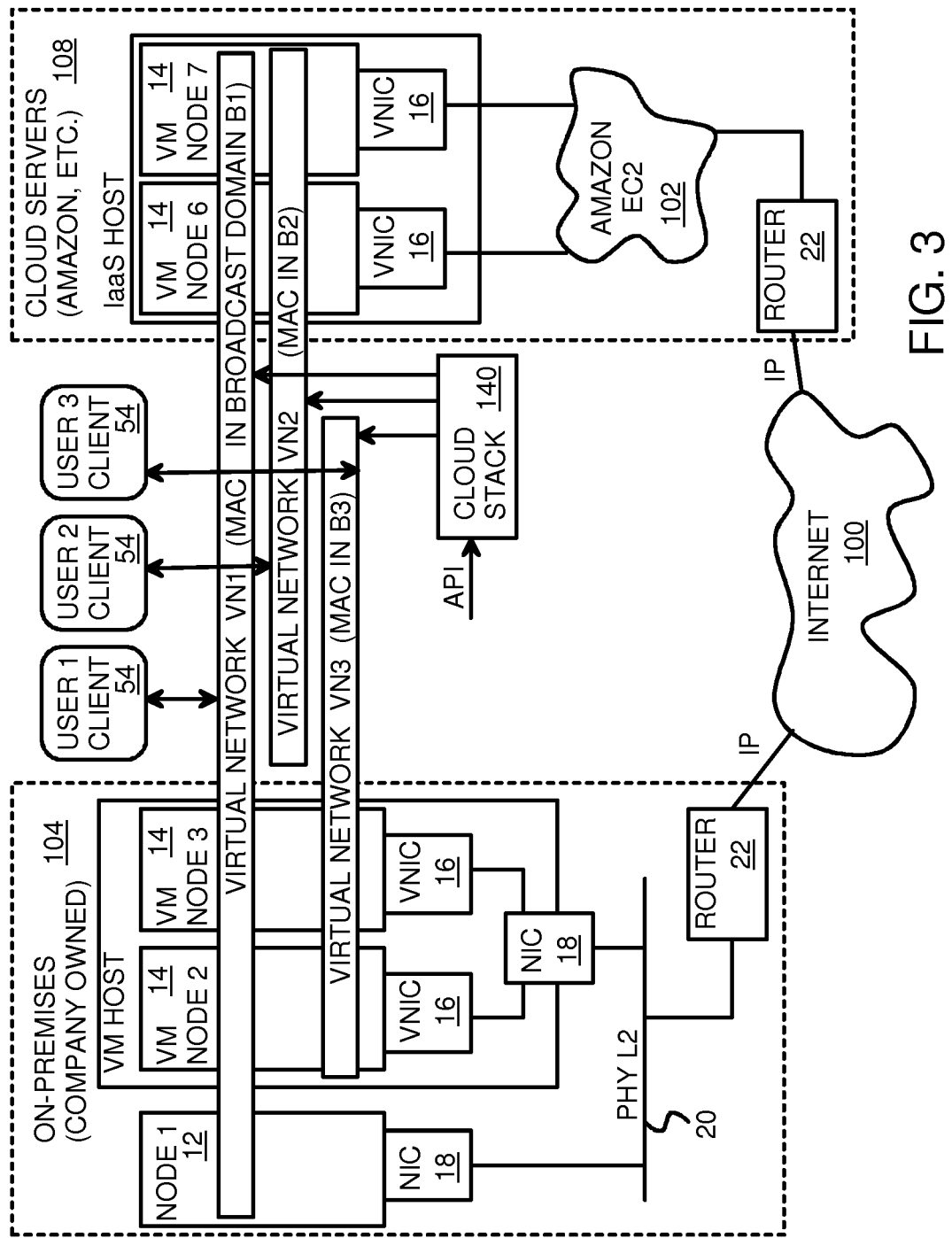
FIG. 3 highlights user-configuration of virtual networks on a hybrid cloud infrastructure.

FIG. 3 highlights user-configuration of virtual networks on a hybrid cloud infrastructure. Virtual networks VN1, VN2, and VN3 are layer-2 virtual networks that allow any node on the virtual network to communicate with any other node on the virtual network. Each of virtual networks VN1, VN2, and VN3 behave as though they were connected using a familiar physical layer-2 switch. However, in reality, they are connected via a distributed virtual layer-2 switch that forwards Ethernet frames to the correct destination using the underlying physical network.

Virtual-network-configuration clients 54 are software clients run by IT staff of subscribers of Virtual Network IaaS provider or cloud-computing provider 108. Virtual-network-configuration clients 54 allow VN IaaS subscribers to configure each of virtual networks VN1, VN2, and VN3 independently from each other as well as from the internet and the physical network provided by cloud-computing provider 108 to their subscribers.

Virtual-network-configuration client 54 can be activated to add a new node to the virtual network. The new node could be a VM node 14 at cloud service provider 108, a new physical node 12 or VM nodes located on premises 104, or a hosted physical node 13 at hosted server location 106 (FIG. 2). A virtual Ethernet and a virtual IP address are assigned to the new node.

The physical routes from the new node to all the other nodes in the virtual network are determined by including the physical IP address of the physical server that runs the node in the switch table that is downloaded to each node in the virtual network. With this physical IP address, each node relies upon the built-in routing capabilities of the physical network infrastructure to determine a route to the node.

Cloud stack 140 is an IaaS orchestration solution that monitors, messages, and manages all virtual networks, including virtual networks VN1, VN2, and VN3. Examples of cloud stacks include those by cloud.com, Eucalyptus, Nimbula, and Enomaly, although not all may be supported. Cloud stack 140 is optional. An applications-programming interface (API) is provided to cloud stack 140 to be programmed by the IT staff at on-premises location 104. Amazon EC2 has its own internal cloud stack that provides programmatic access to EC2 services such as 'start/stop/save/copy instance', etc. Other cloud stacks have similar commands in their APIs, but the targets for these commands are VM hosts running on premises.

The organization could also connect virtual networks VN1, VN2, and VN3 to other hosted servers, such as hosted-server location 106 (not shown), or other providers of cloud-computing provider 108, or additional locations of on-premises location 104. Each of on-premises location 104, hosted-server location 106, cloud-computing provider 108 could have many different physical locations. Each virtual-machine host may have multiple guests or virtual-machine nodes 14 per host.

There may be no on-premises nodes in the virtual network, for example as indicated by VN2. The organization may wish to create a virtual network among nodes that run entirely within cloud computing provider 108 or hosted server location 106. Or perhaps create a virtual network that includes nodes that all reside off premises such as when they span multiple cloud computing providers 108 and/or hosted server locations 106.

Figure 4:
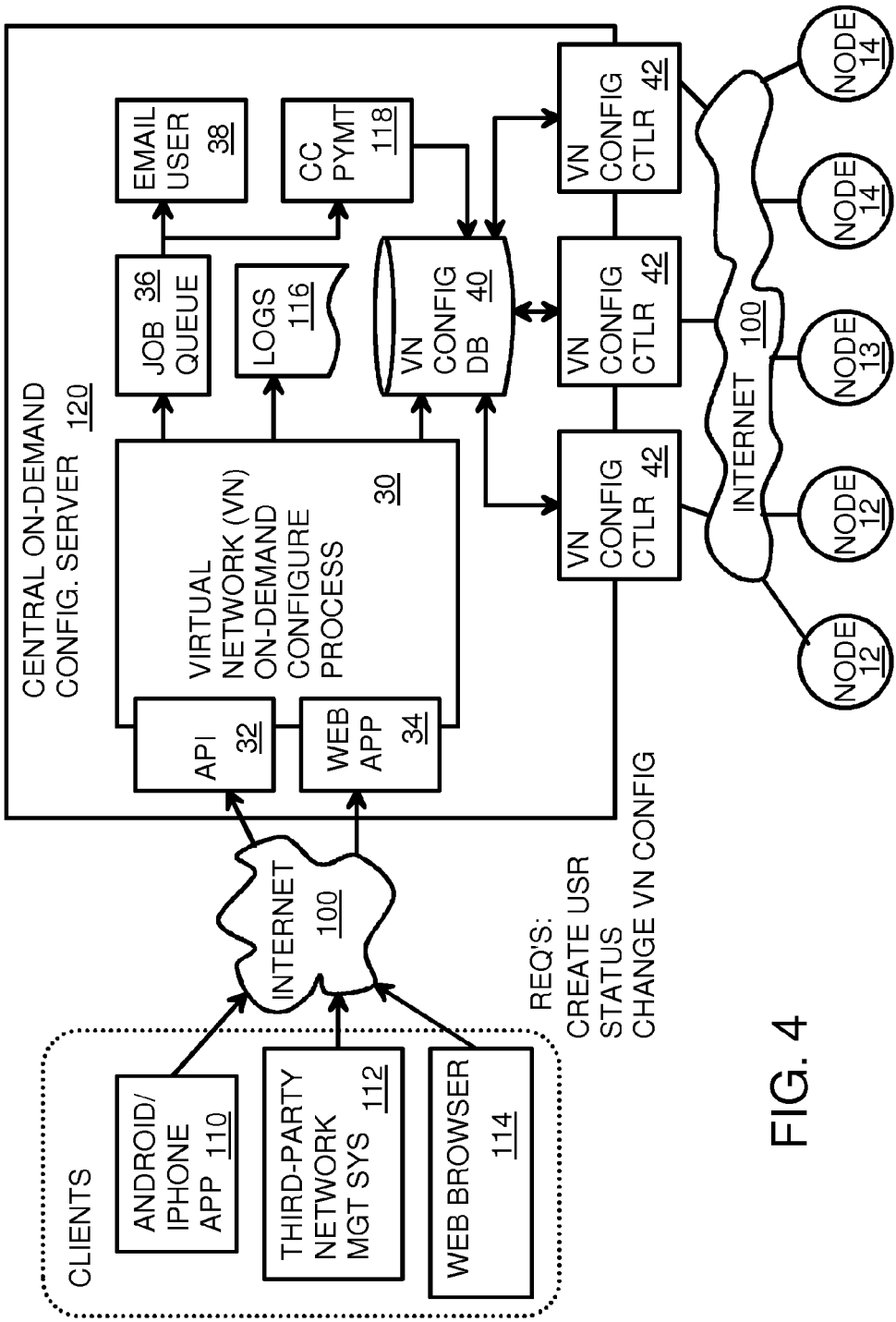
FIG. 4 shows on-demand virtual-network configuration software.

FIG. 4 shows on-demand virtual network configuration software used by an independent VN IaaS provider, or a cloud computing provider that offers virtual networking services. Subscribers of the VN IaaS service send requests to configure a virtual network over Internet 100 to central on-demand VN configuration server 120. The IT staff at subscribing organizations uses client apps such as web browser 114, Android or iPhone apps 110, or third-party network management system 112 to generate these requests and to receive status reports and updates. Requests can include creating a new virtual network, a new instance of VM node 14 to add to an existing virtual network, changing configuration of a virtual network, requesting status of a virtual network, adding new administrators, etc. A single subscriber may create many virtual networks rather than just one virtual network.

The client communicates with web app 34 or API 32 over Internet 100. Web app 34 is a web-based front-end application that provides an interface for clients to virtual-network configuration process 30 on central on-demand VN configuration server 120. API 32 is a front end application for non-web-based client applications.

Virtual-network configuration process 30 responds to requests from clients by creating and/or authenticating new users, changing network configurations, and/or sending back configuration and status reports. Changes to the configuration of the virtual network, such as the addition or deletion of nodes, are written into VN configuration database 40 by virtual-network configuration process 30.

VN configuration controller 42 reads VN configuration database 40 and updates a switch table (not shown) for a particular virtual network. The updated switch table is then sent by VN configuration controller 42 over Internet 100 (and local LANs) to nodes on the virtual network, such as physical nodes 12, hosted physical nodes 13, and VM nodes 14. All of the nodes on the virtual network receive an updated switch table when a new node is added to the virtual network.

There may be one VN configuration controller 42 for each virtual network, or one VN configuration controller 42 may be used for all virtual networks for a particular subscriber. It is also possible that a single VN configuration controller is shared among multiple subscribers.

The VN IaaS provider may bill the subscriber for the additional nodes that are added to a VN. If the VN service is being offered by a cloud computing provider they may also bill the subscriber for the additional processing and storage resources of the new node. When the virtual network is expanded by adding a new node, virtual-network configuration process 30 adds a new job to job queue 36 and logs the addition into logs 116. A credit-card or other accounting module such as payment module 118 is activated to bill the subscriber for the additional resources that the expanded virtual network requires, and the subscriber is emailed a notification for their record keeping by emailer 38. Payment module 118 may also periodically read VN configuration database 40 to determine what network resources are being made available during that period of time, and bill the subscriber for the time and resource.

VN configuration controller 42 is a software process that monitors and controls sets of nodes in a virtual network. VN configuration controller 42 may ping each node on the virtual network and process keepalive messages, as well as update network configurations. Ping may refer to an ICMP ping, or to any network-based mechanism to check the availability of a node. The nodes may also ping the controller.

An error module (not shown) may also be integrated with virtual-network configuration process 30. The error module could detect when an error occurs, such as when one of VN configuration controllers 42 reports that a node is off-line or not responding to pings, or when other network errors occur. While VN configuration database 40 represents the desired state of the virtual network, VN configuration controller 42 may detect that the actual state of the virtual network is deficient. Errors could be logged or emailed to the subscriber, or some kind or error processing or recovery process could be activated. The error module may also be used for configuration changes.

FIGS. 5A-B show virtual-networking daemons and shims added to each node on the virtual network. Node 15 can be any node on the virtual network, such as physical node 12, hosted physical nodes 13, or VM nodes 14. Node 15 can be located at on-premises location 104, hosted-server location 106, or cloud-computing provider 108 (FIG. 2). FIGS. 5A-B show only the network interface portion of the nodes, while the processor, storage, internal buses, and other components of a node are not shown.

In FIG. 5A, a separate shim embodiment is illustrated. Node 15 has a user process space (user space) that executes applications 122 that can include web server, databases, email, and other applications run by end-users. Applications send and receive data through network stack 48, which is the Transport-Control-Protocol/Internet Protocol (TCP/IP) network stack.

The layer-3 IP packets are prepended with layer-2 MAC headers to create Ethernet frames within network stack 48, which outputs them to one of Ethernet Network Interface Controller (NIC) devices 52.

The creation of Ethernet frames may take place directly within network stack 48, or it may provide sufficient information about the network (such as the MAC address) to the device driver contained in Ethernet Network Interface devices 52 so that it can construct Ethernet frames for deliver onto the network.

VN configuration controller 42 (FIG. 4) communicates with virtual network management daemon 46, which executes in the user space of node 15. When a new node is added to the virtual network and VN configuration database 40 is updated, VN configuration controller 42 sends the updated switch table to virtual network management daemon 46, which stores the updated table as VN switch table 50. VN switch table 50 has the address information for all nodes in the virtual network.

VN device driver shims 44 are inserted between network stack 48 and Ethernet NIC device 52. VN device driver shims 44 intercept Ethernet frames being sent by network stack 48 and look up the virtual MAC addresses of the destination node in VN switch table 50. The physical IP address and port of the virtual destination node is read from VN switch table 50. The Ethernet frame is then encapsulated in a new IP packet with the destination IP set to be the physical IP address of the destination node that was read from VN switch table 50. The new IP packet is encapsulated with an Ethernet frame and then sent from VN device driver shim 44 to NIC device 52 for transmission over the physical network.

When one node sends data to another node, it uses the other node's virtual IP address as the destination IP address. Network stack 48 on the sending node then finds the virtual MAC address for this virtual IP address. VN device driver shim 44 then encapsulates the Ethernet frame in a routable IP packet which is then used to create a new Ethernet frame for transmission.

The Ethernet frame is sent through the physical network, which can include both Ethernet switches and IP routers using the physical MAC and IP addresses to reach the physical destination node Once the data packet reaches the destination node, VN device driver shim 44 examines the protocol and port and removes the Ethernet and IP headers to reveal the packet payload. This payload is the original virtual Ethernet frame that contains virtual MAC and IP addresses for the destination VN nodes. Then the virtual Ethernet frame is sent up to network stack 48 and to the applications on the destination node.

Alternately, this communication can be done not by encapsulation of virtual Ethernet frames in physical IP packets, but rather by replacing the virtual MAC and IP addresses in the Ethernet header and payload with physical addresses. This alternative, however, would be restricted to use with only IP packets.

Node 15 may have multiple NIC devices 52. A different VN device driver shim 44 is placed before each NIC device 52. Network stack 48, VN device driver shims 44, and VN switch table 50 are located in the kernel space.

FIG. 5B shows an alternate embodiment using a muxing VN device driver shim. Rather than have separate VN device driver shims 44 for each NIC device 52, a single muxing VN device driver shim 44' is placed below network stack 48. Muxing VN device driver shim 44 determines which one of NIC devices 52 to send the Ethernet frame to, based on the routing information configured in the node.

Figure 6:
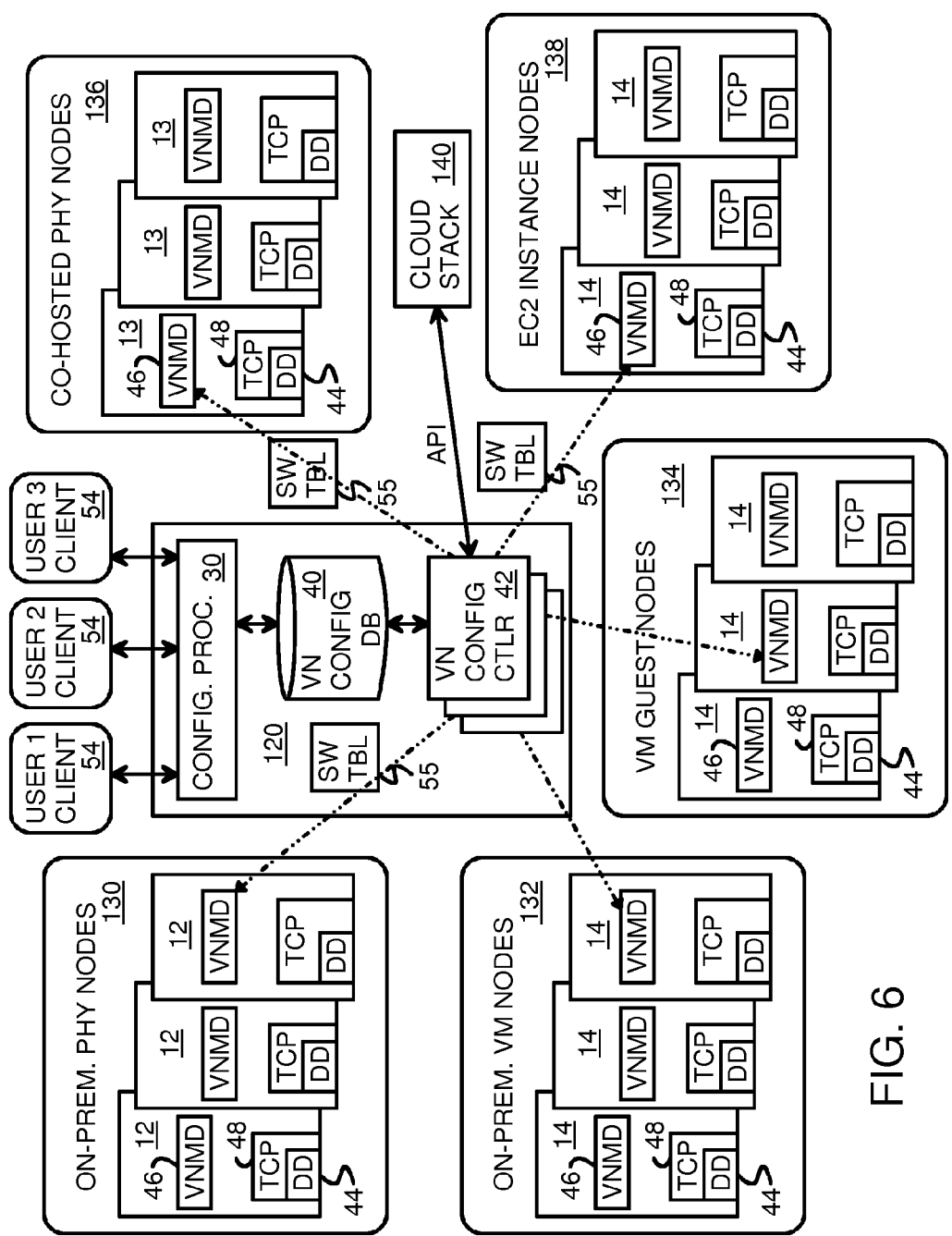
FIG. 6 highlights an updated switch table being broadcast to all nodes on a virtual network.

FIG. 6 highlights an updated switch table being broadcast to all nodes on a virtual network. When a subscriber configures a virtual network, such as by adding a new node, the request is entered into virtual-network configuration client 54 and sent over Internet 100 to virtual-network configuration process 30 in central on-demand VN configuration server 120. Virtual-network configuration process 30 authenticates the subscriber and creates a new node entry for the virtual network. The switch table for the virtual network is updated in VN configuration database 40.

Changes to VN configuration database 40 trigger VN configuration controller 42 to read the updated switch table and send updated switch table 55 to all nodes on the virtual network. In particular, updated switch table 55 is sent to virtual network management daemon 46 running in the user space on each physical node 12, hosted physical nodes 13, and VM nodes 14. Each node has its virtual network management daemon 46 over-write its local switch table, VN switch table 50 (not shown) in the kernel space.

When applications running in nodes 12, 13, 14 send out TCP/IP packets, network stack 48 is activated and generates Ethernet frames. VN device driver shim 44 intercepts the Ethernet frames and searches updated VN switch table 55 for a matching entry, then encapsulates the virtual Ethernet frame in a new physical IP packet and Ethernet frame with the original frame as the payload and the physical IP and MAC addresses of the destination node.

Cloud stack 140 may be used as an alternative to user client 54 to access VN configuration controller 42 via programs that provide automation capabilities such as auto-scaling and operator-free administration and control.

Virtual network management daemon 46 and VN device driver shim 44 can be placed on a wide variety of nodes, including physical nodes 12 at on-premises physical nodes 130, VM nodes 14 running on-premises in virtual hosts at on-premises VM nodes 132, VM nodes 14 running off-premises in virtual hosts at VM guest nodes 134, physical nodes 13 running off-premises at co-hosted physical nodes 136, and VM nodes 14 running off-premises at EC2 instance nodes 138. One or more cloud computing providers or hosted server locations can provide some of these nodes, or all of these nodes, while other nodes may be located on-premises by the subscriber.

For example, Rackspace can be used for co-hosted physical nodes 13, while Amazon EC2 for off-premises VM nodes 14. Additional physical nodes 12 and VM nodes 14 could be located on-premises at an organization-owned location. The virtual network spans both physical and virtual-machine nodes, both on-premises and off-premises.

Figure 7:
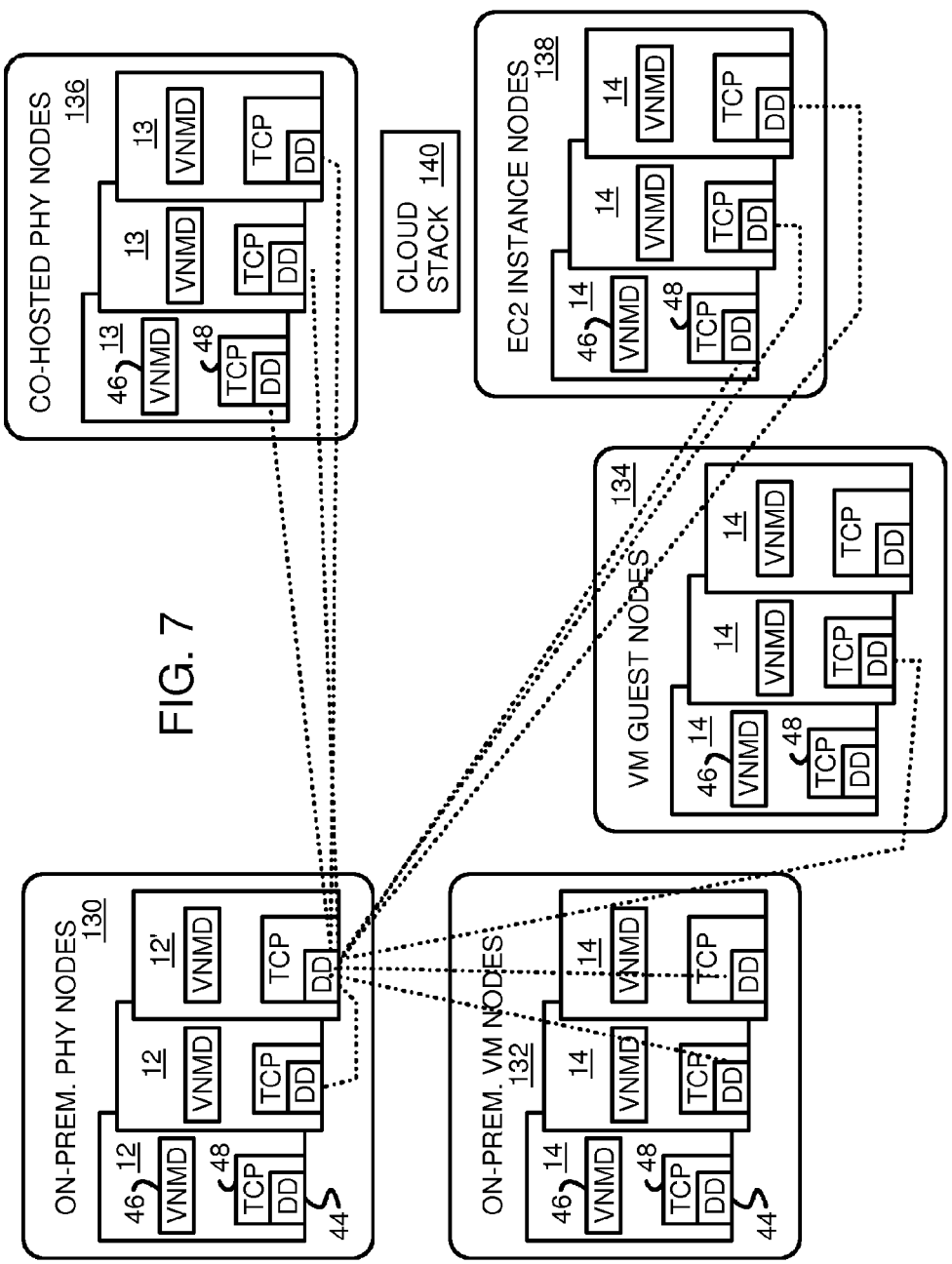
FIG. 7 shows one virtual network node connecting to other virtual network nodes on a virtual network.

FIG. 7 shows one node connecting to other nodes on a virtual network. Only the connections from one node are shown in FIG. 7. Each node in the virtual network is connected to all other nodes in the virtual network. VN switch table 50 (FIG. 5A) contains entries for reaching all nodes in the virtual network. A copy of VN switch table 50 is stored on each node on the virtual network.

Once VN switch table 50 has been updated in each node in the virtual network, then virtual Ethernet frames may be transferred directly from one node to another in the virtual network in a point-to-point connection. The nodes do not have to get assistance from central on-demand VN configuration server 120 or from VN configuration controller 42. Thus networking performance is not degraded, except perhaps for a small delay by VN device driver shim 44. Since physical networks are used to physically transfer the data over the virtual network, the performance of the virtual network is about the same as that of the physical network.

The size of VN switch table 50 can be much smaller than for switching tables for the physical network. Each virtual network has a limited number of nodes.

The physical network can be much larger than the virtual network. For example, hosted-server location 106 and cloud-computing provider 108 may each have hundreds or thousands of subscribers, each with hundreds of nodes. The physical layer 2 switching tables for such large physical networks are so big that often IP routing at layer 3 is used which offers hierarchical addressing.

Figure 8:
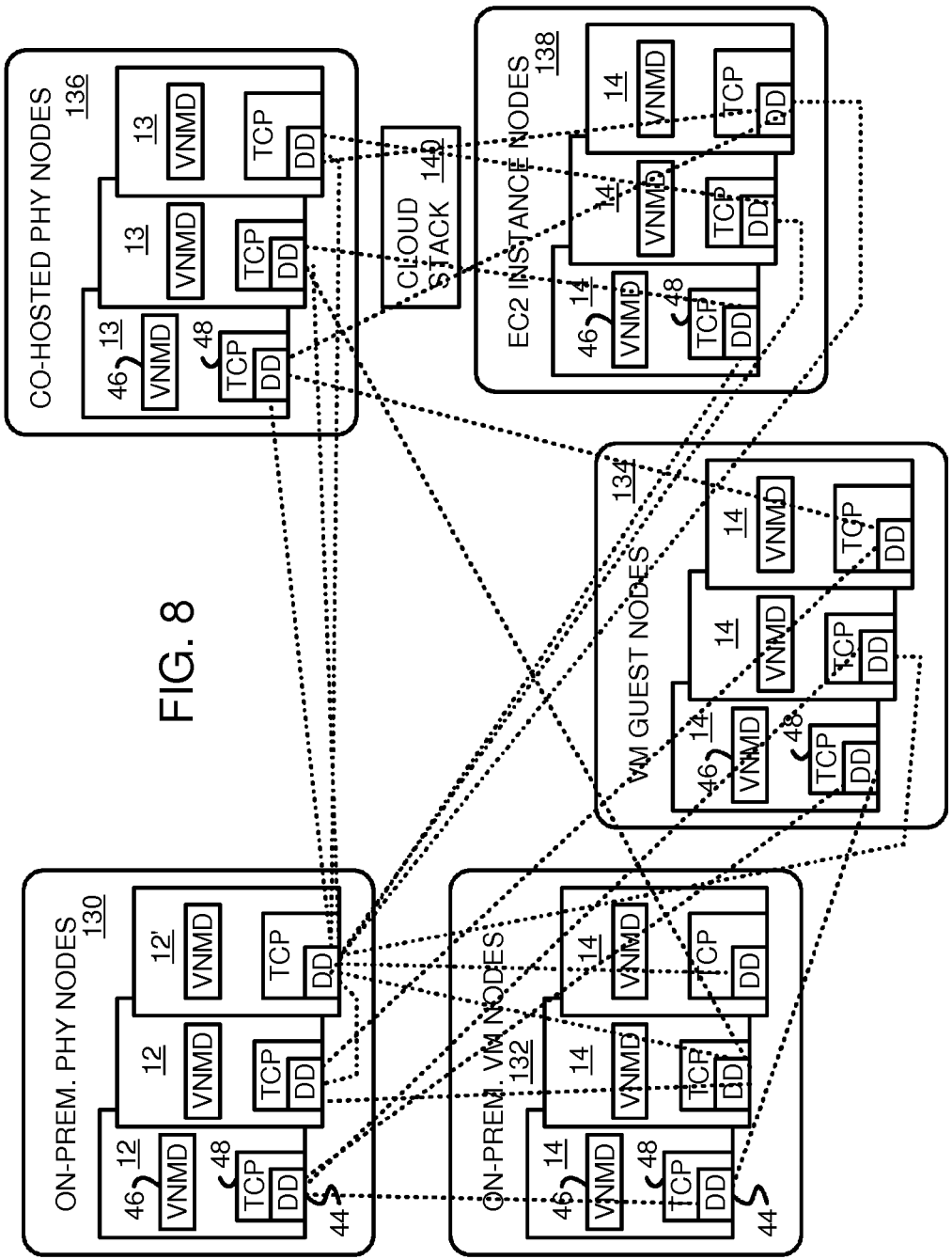
FIG. 8 shows a mesh of virtual-machine nodes connecting to other nodes on a virtual network.

FIG. 8 shows a mesh of nodes connecting to other nodes on a virtual network. The connections among several nodes are shown in FIG. 8. Each node in the virtual network is connected to all other nodes in the virtual network. VN switch table 50 contains entries for reaching all nodes in the virtual network. A copy of VN switch table 50 is stored on each node on the virtual network. The virtual network is a fully-meshed network, which is a faster topology than a hub-and-spokes arrangement often used for VPNs that span many organizations.

The virtual network is fully meshed since each node has its own local VN switch table 50 with entries for forwarding packets directly to every other node on the virtual network. The number of unique paths in this fully meshed network is N squared minus N (or N*(N−1)), where N is the number of nodes in the networks. The packets do not have to go through a central hub node before being reaching the destination. Prior-art VPN tunnels are point-to-point links that may need to each be set up by hand (manually). The administrative overhead of manually setting up N*(N−1) VPN tunnels for a fully meshed network is prohibitive, and many organizations may fall back on a hub-and-spoke arrangement. With a hub-and-spoke arrangement, the number of paths equals N, the number of nodes in the network. The additional latency and performance bottleneck of the hub-and-spoke topology is avoided by the fully meshed virtual network, which is feasible since individual VPN tunnels do not have to be set up. And since the VN switch table 50 is identical for each of the nodes in the virtual network, the complexity of the problem collapses from N squared to N (i.e. linear).

Figure 9:
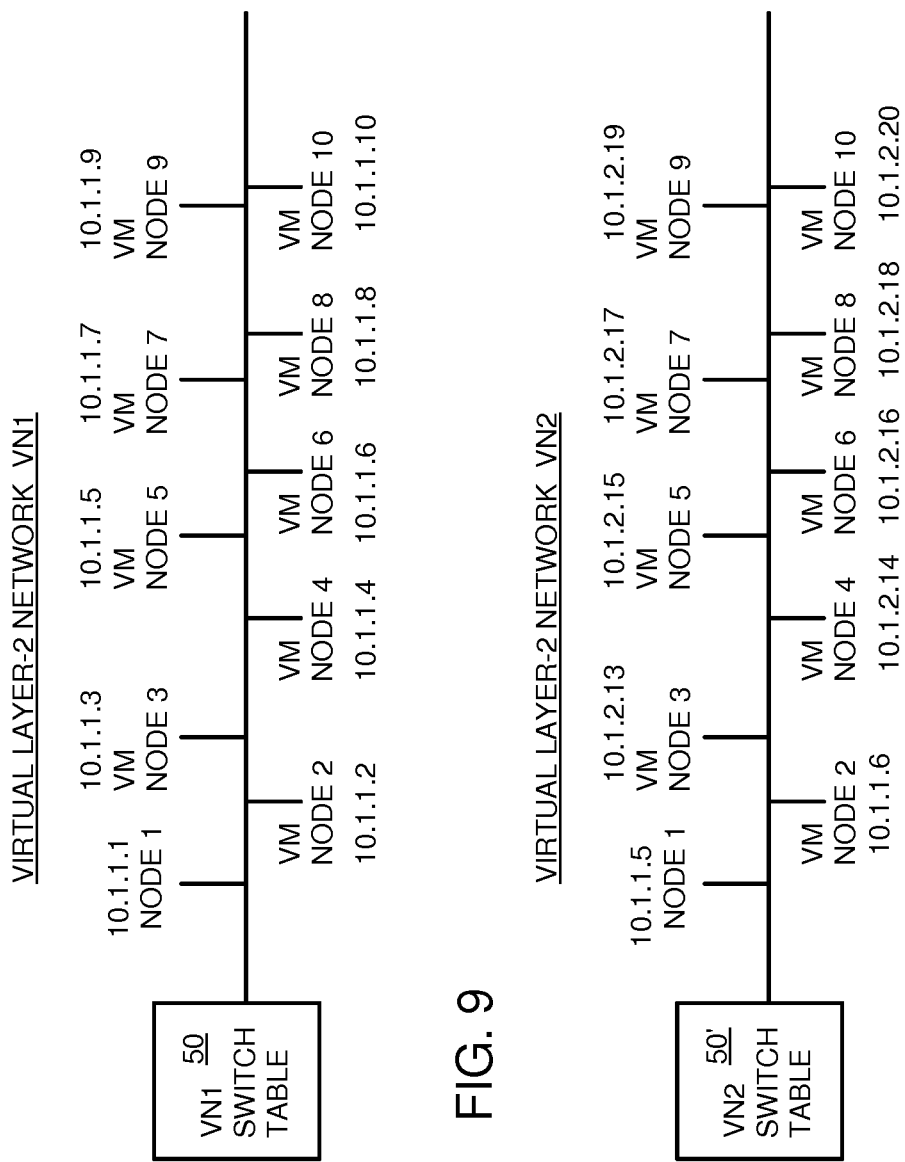
FIG. 9 shows nodes on two virtual networks.

FIG. 9 shows nodes on two virtual networks. VN switch table 50 contains entries for virtual network VN1. Virtual network VN1 contains 10 nodes, with virtual IP addresses 10.1.1.1, 10.1.1.2, . . . 10.1.1.10. Each node also has a virtual MAC address.

A second virtual network VN2 has its entries stored in VN switch table 50'. Virtual network VN2 also contains 10 nodes, with virtual IP addresses 10.1.1.5, 10.1.1.6, 10.1.2.13, 10.1.2.14, . . . 10.1.2.20. Note that virtual IP address 10.1.1.5 is used on both virtual network VN1 (node 5) and virtual network VN2 (node 1). Also, virtual IP address 10.1.1.6 is used on both virtual network VN1 (node 6) and virtual network VN2 (node 2). However, no conflict occurs on the physical networks, such as Internet 100, since these virtual IP addresses are encapsulated in physical Ethernet frames and IP packets with physical MAC and IP addresses before transmission over the physical networks. Virtual network VN1 is unaware that virtual network VN2 uses the same virtual IP address, or that these IP addresses refer to different physical nodes. Each virtual network is free to assign its own virtual IP and MAC addresses since the virtual networks are independent and isolated.

FIG. 10 shows entries in a VN switch table. Separate VN switch tables 50 could exist on a node that connects to more than one virtual network, such as a node that connects to both VN1 and VN2. Alternatively, a merged VN switch table 50 could exist on a node, where a VN_ID field identifies each entry in VN switch table 50 as belonging to VN1 or to VN2.

A node_ID field identifies the destination node on the virtual network. Each entry (row) shows the forwarding information for a different destination node on a virtual network. The virtual IP addresses are those used by application running on the source node. These virtual IP and MAC addresses are used in IP packets and Ethernet frames which are encapsulated in new packets and frames with the physical IP addresses from the matching entry in VN switch table 50. The physical MAC address is determined by existing physical network mechanisms, just as it is for every other packet that uses the physical network. An encryption key may also be stored with the entry in VN switch table 50. The encryption key can be used to encrypt the payload before transmission over the Internet, or for using a VPN for routing.

For example, when a source node runs an application program that sends a packet to node 3 on VN1, the virtual IP address is 10.1.1.5 and the virtual MAC address is 14:79:81:00:15:55. The virtual IP address and the virtual MAC address are generated by VN configuration controller 42 and inserted into VN switch table 50.

The virtual MAC address of the destination node is looked up in VN switch table 50 and a match is found in the third entry. An encapsulating packet is formed with the physical IP address of 72.45.1.5 and a User Datagram Protocol UDP port of 8002 (or the virtual IP address is replaced with the physical IP address of 72.45.1.5). This packet can then be routed over the local LAN to the Internet and on to the physical destination. If Ethernet frames are modified, instead of encapsulated, virtual IP are replaced with the physical IP address of 72.45.1.5.

Note that the same destination virtual MAC address can theoretically exist on two different virtual networks. The physical MAC address does not need to be stored in VN switch table 50 for the transmitting node since it is the MAC address of the next device (hop) after the NIC attached to the transmitting node. This MAC address is retrieved and inserted as necessary by the networking stack 48 and/or Ethernet NIC 52.

Figure 11A:
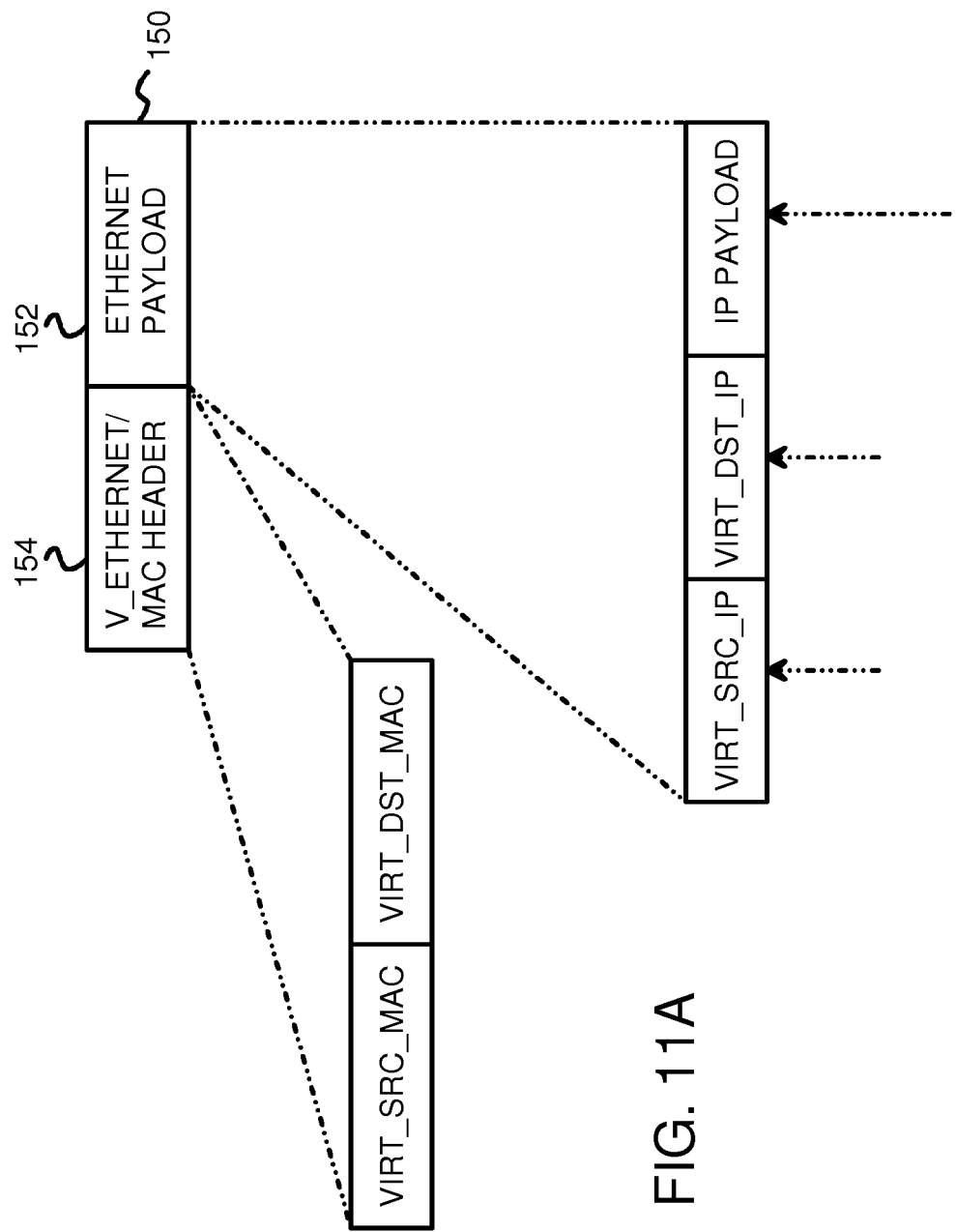
FIGS. 11A-C highlight encapsulation of a virtual packet with a physical packet.
Figure 11B:
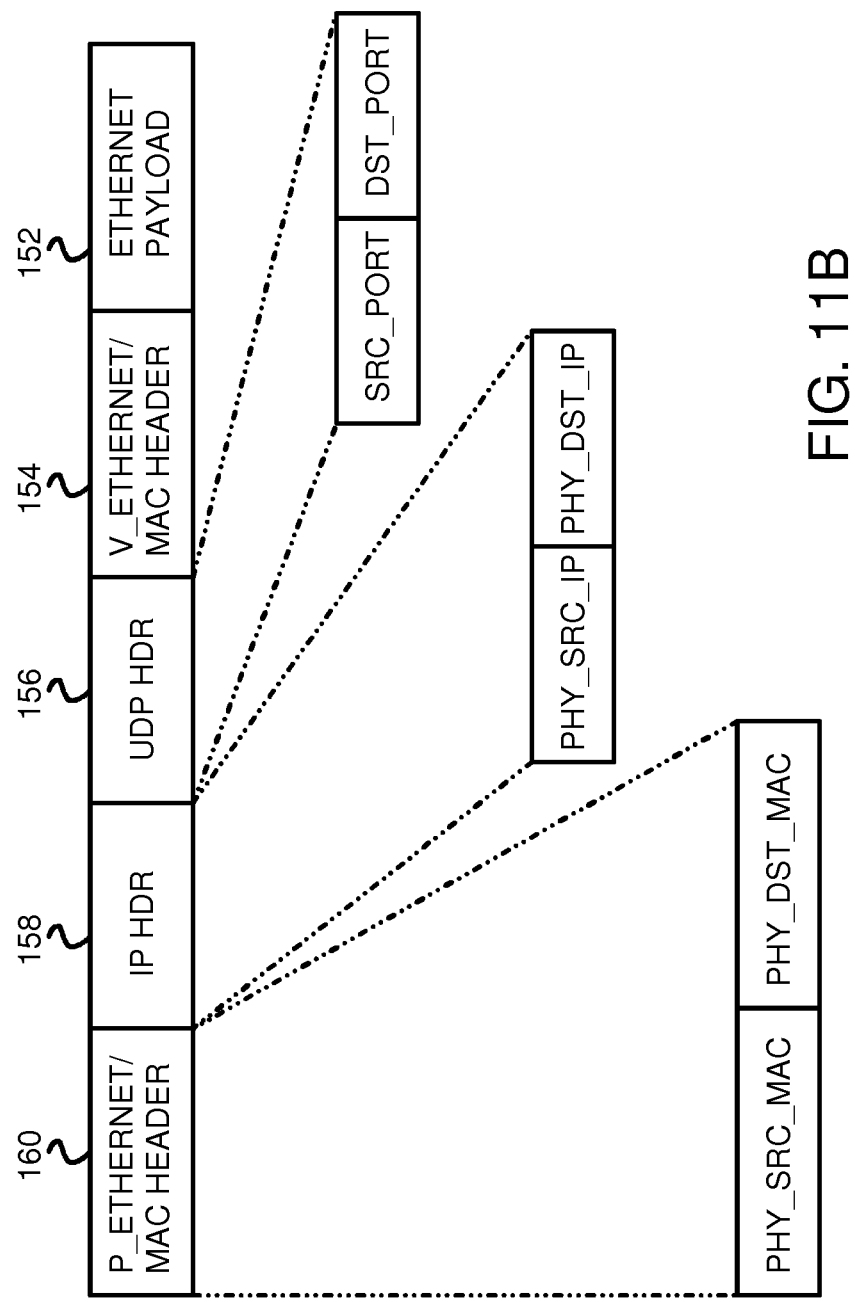
Figure 11C:
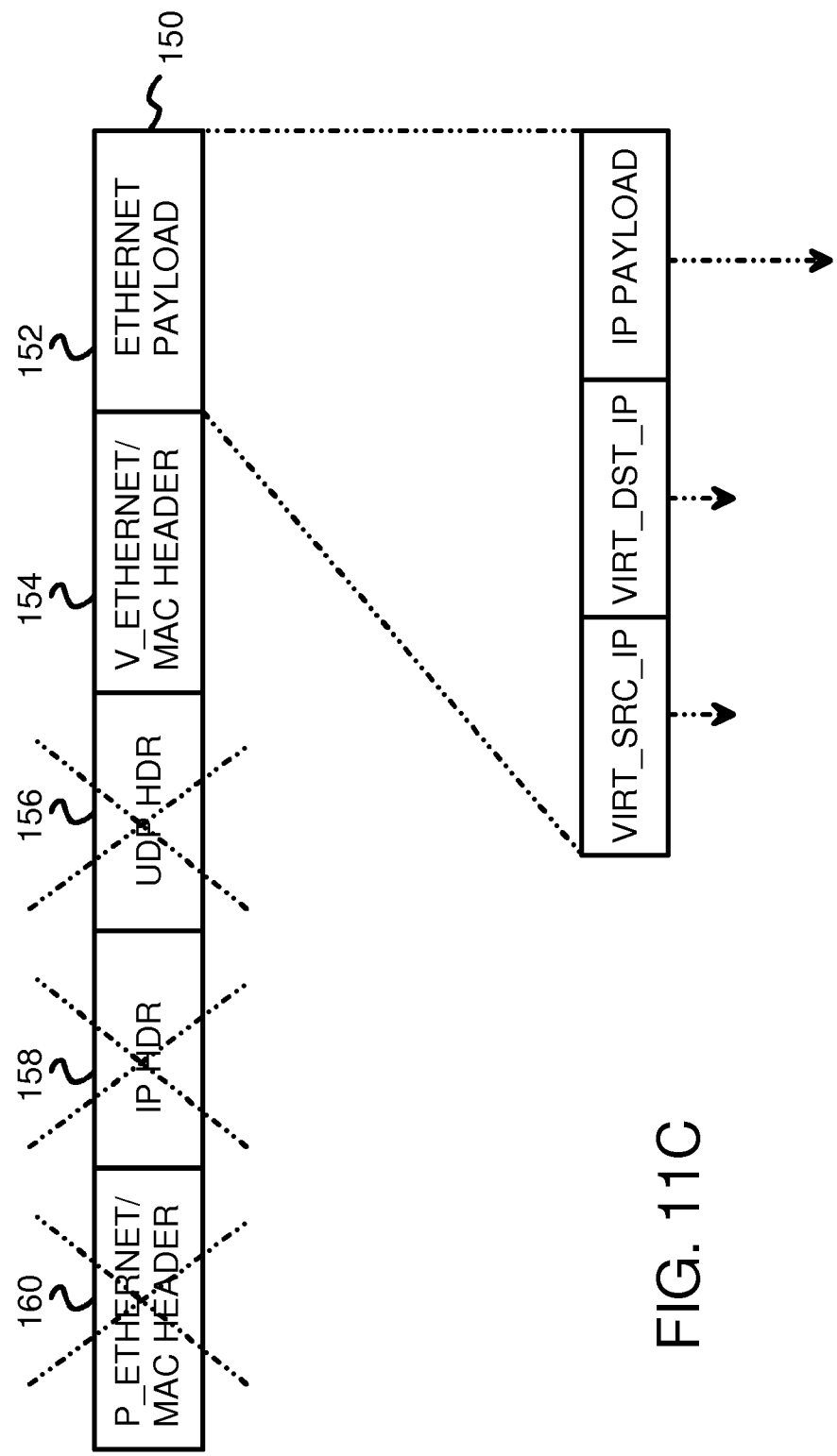

FIGS. 11A-C highlight encapsulation of a virtual packet with a physical packet. In FIG. 11A, an application program on a source node generates Ethernet payload 152, which includes the IP data payload, the virtual destination IP address, and the virtual source IP address. Virtual Ethernet header 154 is attached by network stack 48 (FIG. 5A). Virtual Ethernet header 154 includes virtual source and destination MAC addresses. Other field that are not shown may also be present in the header.

Virtual Ethernet frame 150 is intercepted by VN device driver shim 44 after being generated by network stack 48 on the source node, and before being transmitted by NIC device 52.

In FIG. 11B, VN device driver shim 44 pre-pends UDP header 156 to virtual Ethernet header 154 and Ethernet payload 152. UDP header 156 includes the source and destination UDP ports. The destination UDP port is read from VN switch table 50, while the source UDP port is pre-defined for the source node.

VN device driver shim 44 then attaches physical IP header 158, with the physical source and destination IP addresses. The physical destination IP address is read from VN switch table 50, while the physical source IP address is pre-defined for the source node.

Finally VN device driver shim 44 attaches physical Ethernet header 160, which includes physical source and destination MAC addresses. The physical source and destination MAC addresses are provided to the VN device driver shim 44 by the existing standard physical network infrastructure mechanisms.

The physical MAC addresses allow the Ethernet frame to be forwarded to the external switch on the organization's or service provider's LAN, while the physical IP addresses allow the embedded IP packet to be routed over the public Internet.

In FIG. 11C, the physical packet is stripped of headers at the destination node. Physical Ethernet header 160 is removed when the Ethernet frame exits the source node's LAN and enters the Internet. Another physical Ethernet header 160 may be attached when the packet enters the destination's LAN from the Internet. The destination UDP port is read from UDP header 156, and when the UDP port matches the UDP port used by VN device driver shim 44, it indicates that the packet routed over physical networks is a virtual network packet. Upon arrival at the destination node, physical Ethernet header 160 and physical IP header 158 are removed by VN device driver shim 44.

For example, all virtual network packets could have a UDP port of 8002, just like web browser packets typically use TCP port 80. UDP port 8002 identifies packets as being virtual network packets.

When the UDP port matches, VN device driver shim 44 recognizes that this packet is one of the tunneled encapsulated packets and needs to be unpacked. It removes the Ethernet header 160, the IP header and UDP header 156. The remaining fields in the packet, Virtual Ethernet header 154 and Ethernet payload 152, are passed up to network stack 48. Network stack 48 then sends the IP payload to the application identified to receive packets for the virtual IP address in Ethernet payload 152. For example, an application program that is a server app could receive all TCP packets sent to the virtual IP address on port 5000, or a load-balancing program could receive packets for virtual IP addresses and then distribute them uniformly across a server farm. A database application might receive packets at a virtual IP address from an application server that needs to access the database to process customer requests.

To network stack 48, virtual Ethernet frame 150 appears to be a standard Ethernet frame received over a LAN. Applications running on the node, and network stack 48, are unaware that the packet was routed over the Internet. It appears to these applications and to network stack 48 that the frame was forwarded over the organization's local LAN.

Figure 12B:
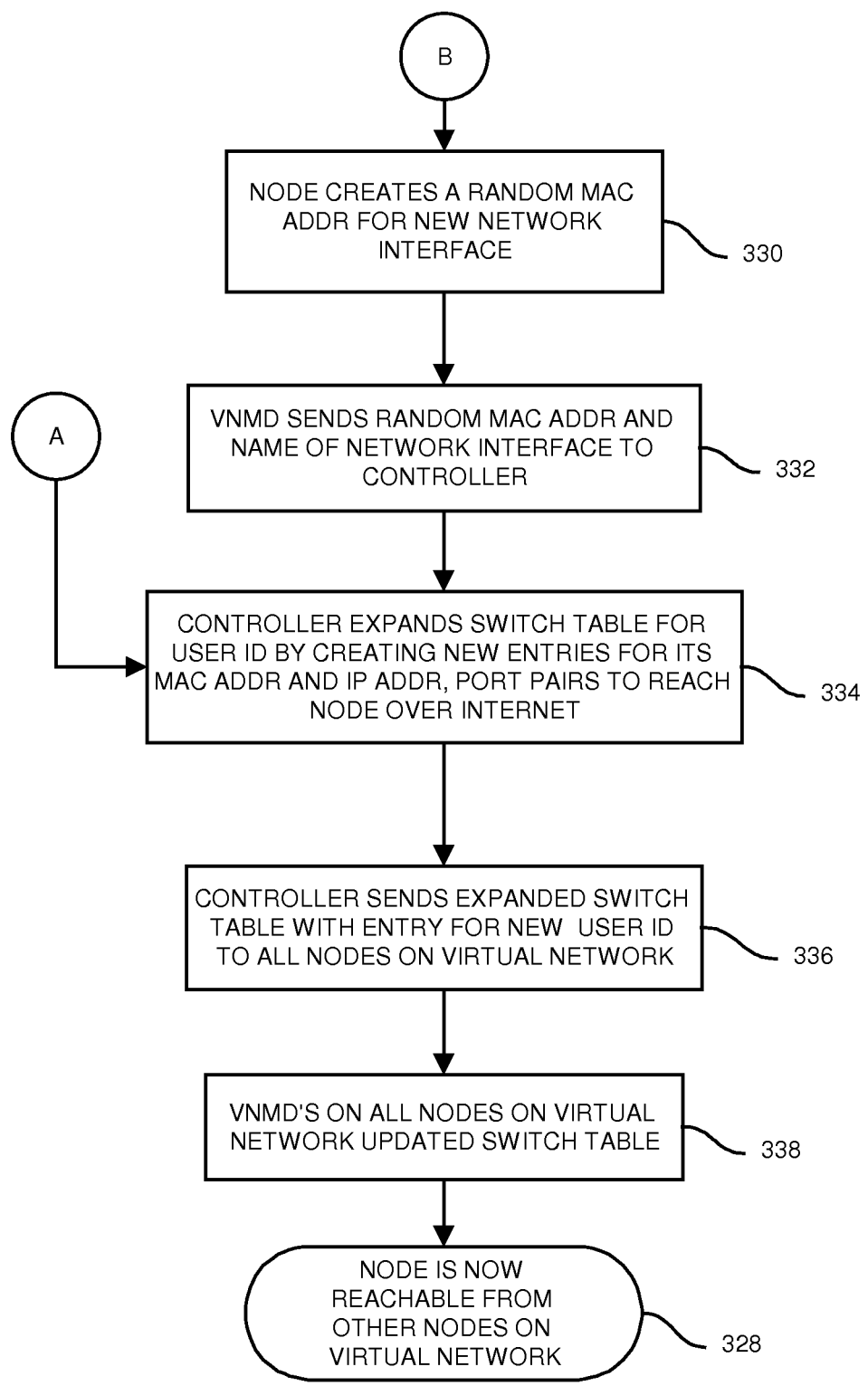

FIGS. 12A-B shows a flowchart of adding a new node to a virtual network. When a node wakes up, such as when a new instance or a new guest VM node is created to meet a demand surge at cloud-computing provider 108 or at hosted-server location 106 (FIG. 3), or a physical node is re-activated, the procedure of FIG. 12A-B is activated.

Before this process can begin both virtual network management daemon 46 and device driver shim 44 are installed and running on each of the nodes that are required on the VN. This can be done by an installation program that copies and/or updates the software, starts and restarts it as necessary.

On the new node, virtual network management daemon 46 (VNMD) searches for a node ID and a user ID stored on the node, step 302. The user ID can be a stored access-token or a customer ID that identifies the organization, for example. The node ID may be found, step 304, if the node was suspended for some reason, rather than being a new instance or guest being created fresh. When the node ID is found, a hello message is sent to VN configuration controller 42 (FIG. 5A), step 306. This hello message includes the node ID and the user ID. VN configuration controller 42 looks up the node ID and finds an existing entry for this node ID, step 308. The existing entry may still contain the physical IP address and port to reach the new node. The process then continues with step 334 on FIG. 12B.

When virtual network management daemon 46 does not find the node ID, step 304, the new node has not existed before but is being created. New guest VM nodes and new instances on Amazon EC2 may wake up without a node ID. A hello message is sent to VN configuration controller 42 (FIG. 5A), step 310, with the user ID but no node ID, or a string indicating an unknown ID.

In response to the hello message, VN configuration controller 42 creates a new node ID and sends the new node ID to the new node, step 312. The new node enters an unassigned state, step 314, indicating that the new node has not yet been assigned to a virtual network. The node ID created by VN configuration controller 42 is stored locally on the new node by virtual network management daemon 46, step 316.

The subscriber (customer of the VN IaaS provider or cloud-computing provider 108) assigns the new node to one of their virtual networks, step 320. This assignment can be done manually by the subscriber's IT staff or by an automated script, program or cloud stack, that interfaces to virtual-network configuration process 30 (FIG. 4), such as one of the clients in FIG. 4.

VN configuration controller 42 then sends a join message to the new node, step 322. The join message includes an assigned virtual IP address and the name or identifier of the virtual network the new node is to join. On the new node, virtual network management daemon 46 receives the join message and creates a network interface for the virtual IP address received from VN configuration controller 42, step 318.

VN device driver shim 44 is loaded into the kernel space and will later intercept packets from network stack 48 with this virtual IP address as a source IP address.

The process then continues on FIG. 12B. Virtual network management daemon 46 or the kernel module on the new node creates a random MAC address for the new network interface, step 330. This random MAC address is the virtual MAC address that network stack 48 on other nodes on the VN use to send Ethernet frames to the new node. Virtual network management daemon 46 sends this random MAC address to VN configuration controller 42, step 332.

VN configuration controller 42 on central on-demand VN configuration server 120 (FIG. 4) writes a new entry to VN configuration database 40. This new entry contains the random (virtual) MAC address, the virtual IP address, and the physical IP address and ports for the new node, step 334. The physical IP address is the IP address of the physical system or vHost running the VM node and is entered by the subscriber into the virtual-network configuration process 30.

VN configuration controller 42 creates a new entry in VN switch table 50 for the new node. The updated switch table now contains sufficient information for every node to reach every other node already existing on the virtual network, step 334. VN configuration controller 42 sends the updated VN switch table 50 to all nodes on the virtual network, step 336. On each of the nodes on the virtual network, virtual network management daemon 46 updates the local copies of VN switch table 50, step 338. The new node also receives the updated VN switch table 50. All nodes on the virtual network can now reach the new node, step 328.

Benefits

Subscribers can create overlay virtual networks, on-the-fly without action by external staff, such as at hosted-server location 106 or cloud-computing provider 108. The subscriber does not need assistance from the staff at cloud-computing provider 108 or any other service provider, since virtual network management daemon 46 and VN device driver shim 44 run on all of their own nodes. Organization dependency is decoupled to provide a self-service, on-demand infrastructure for networks. Thus networking resources can be provided by the same IaaS model as computing and storage resources.

The virtual network connects nodes in a single flat layer-2 fully-meshed network. The nodes can be of any kind, located anywhere. Physical servers located at the subscriber's premises or in co-hosted locations and managed hosting environments can be on the same virtual network as virtual machines on-premises or off-premises on a public infrastructure such as Infrastructure as a Service (IaaS) providers with services such as Amazon's Elastic Compute Cloud (EC2). One virtual network can span many providers and locations. The virtual network provides a subscriber with its own private, uniform address space. A uniform set of network address properties can be applied to both physical and virtual-machine nodes, both on and off premises. The users can ignore the network properties of the physical networks the nodes are actually attached to. Properties such as QoS, access control, error and fail-over recovery, can be the same for all nodes on the virtual network. Virtual-network configuration process 30 on central on-demand VN configuration server 120 provides the subscriber with an on-demand self-service delivery model. Through web-based application 34 or API 32, subscribers can create a user account for their organization and then load VN software such as virtual network management daemon 46 and VN device driver shim 44 onto their nodes that will connect to the virtual network. VN switch table 50 is loaded onto each of these nodes for access by VN device driver shim 44.

A subscriber may create several virtual networks, each being isolated from other virtual networks owned by the same subscriber and isolated from other subscribers. The virtual networks are also isolated from the underlying physical networks that carry the data, since the virtual IP and MAC addresses are encapsulated in packets and frames that use physical IP and MAC addresses by VN device driver shim 44.

Each virtual network can use whatever addressing scheme is desired without interfering with other virtual networks. For example, the same virtual IP or MAC addresses could be used by several virtual networks, and refer to different nodes. Thus independent virtual address spaces may be overlaid upon the same physical networks. The virtual network is independent and does not require any cooperation of any other person or organization.

Applications do not have to be modified to access data on remote physical networks. Applications written for the organization's local LAN can be extended to the cloud for deployment on remote nodes without re-writing. Standard LAN functions such as broadcast, multicast, ARP and RARP are still available on the virtual network. These standard LAN functions may not be supported by hosted-server location 106 or cloud-computing provider 108. Thus the virtual network provides a solution that does not require re-writing applications for the limitations of the VN IaaS provider.

Network-based security techniques that require layer 2 connectivity such as port spanning and promiscuous modes are now available to IaaS subscribers.

The virtual network can easily be expanded without hardware changes. VN configuration database 40 and VN switch table 50 are modified to allow for additional nodes on the virtual network.

Software overhead is reduced by using virtual network management daemon 46, which runs in the user space when VN switch table 50 is being updated. Since VN switch table 50 only needs to be updated when nodes are added or removed from a virtual network, which is a relatively infrequent event, virtual network management daemon 46 does not have to be executing any significant amount of code at other times. VN device driver shim 44 is in the kernel space and is a performance-optimized agent that processes packets without a significant overhead. Since VN device driver shim 44 runs in the kernel space, rather than in the user space, performance is optimized.

The virtual network may be a fully-meshed network, which is typically a more efficient topology than a hub-and-spokes arrangement that may be needed for larger physical networks that span many organizations. Prior-art VPN tunnels are point-to-point links that may need to be set up one-by-one (manually). The administrative burden of this manual setup of VPN tunnels is prohibitive, and many organizations may fall back on a hub-and-spoke arrangement rather than set up many VPN tunnels. The additional latency and performance bottleneck of hub-and-spoke topology is avoided by the fully meshed virtual network, which is feasible since individual VPN tunnels do not have to be set up.

Familiar layer-2 protocols such as Address Resolution Protocol (ARP) and Reverse ARP (RARP) can be used to resolve the IP address to a MAC address (ARP), or resolve the MAC address to an IP address (RARP). Unknown addresses can be broadcast over the network for resolution as needed. Since most packaged applications can be clustered, migration of these kinds of clustered applications to the cloud is simplified.

Each node on the virtual network can communicate with any other node on the virtual network using the layer-2 virtual MAC address. The virtual network appears to be a flat layer-2 switch, even though the nodes are really distributed across many physical networks.

Once each node is configured, VN configuration controller 42 is not involved in normal data transfer. The control plane (VN configuration controller 42 and virtual network management daemon 46) is separated from the data plane (VN device driver shim 44). Thus VN configuration controller 42 and virtual network management daemon 46 do not degrade performance during normal packet transmission. VN configuration controller 42 interaction is not required for packet data transfers; only for updating VN switch table 50 when the network is re-configured. Communication from VN configuration controller 42 may be encrypted to secure information about the updated switch tables.

Since VN switch table 50 only stores switching information for one subscriber's virtual network, the number of entries in the switch table is limited. The entire virtual network can be stored in one VN switch table 50. In contrast, cloud-computing provider 108 may have thousands of subscribers, many with large numbers of nodes on their internal network which may require many thousands of switch table entries. A single switch table may not be feasible for a network with thousands of nodes.

The application in the user space can communicate with another node on the virtual network using a standard socket to network stack 48. A standard virtual IP address may be used. This virtual IP address is hidden from external networks due to encapsulation or translation by VN device driver shim 44. Thus the virtual IP address is private and independent of the physical network space or other networks.

ALTERNATE EMBODIMENTS

Several other embodiments are contemplated by the inventors. For example one VN configuration controller 42 could control one node, or several nodes. A single VN configuration controller 42 could control several different virtual networks rather than just one virtual network. A single VN configuration controller 42 could also support many subscribers. A single subscriber might require more than one configuration controller to support all of their virtual networks. The central server software could be run on premises for in-house use.

While IP packets have been described as being sent as the payload of the virtual frame, other Ethernet payloads could be used other than IP packets. While Ethernet LAN's have been described as the layer-2 physical network, other layer-2 physical networks could be used such as token ring.

Full node-to-node connectivity has been shown in FIG. 8 and is good for performance. However, in some network configurations one or more dedicated gateways may be used for some sets of nodes. Thus some nodes may be connected through the dedicated gateway rather than individually.

In a fully meshed node-to-node embodiment with N nodes, switch table 50 only needs to contain entries for the N endpoints, not for the N^2-N paths. That's because each node can use the same endpoint description to reach a given node. On the other hand, for optimization purposes, there may be more specific end point descriptions given to some nodes. In this "optimized routing", as an example, node A addresses node B with a different address than node C. Thus the total number of endpoint descriptions in the system may actually be >N. But this is an optimization, not a necessity. In another optimization or alternate embodiment, the node-ID and MAC address are one and the same, saving one column in switch table 50 and thus also saving some memory. Since a node can have multiple interfaces, multiple identifiers may point to the same node, which can be handled by those with skill in the art.

Encapsulation as shown in FIG. 11 may vary. For example, the full virtual MAC addresses in virtual Ethernet header 154 does not have to be transmitted in the physical packets, saving bandwidth. The virtual MAC addresses may be re-generated at the destination from VN switch table 50. While UDP has been shown to encapsulate packets, a TCP header could be used rather than UDP header 156. A faked TCP connection could also be used. Raw IP packets could be sent to a dedicated IP address as another way to eliminate the need for UDP header 156. The packet payload could be encrypted. IPsec could be used. A non-IP protocol could be used for encapsulation, such as IPX or a proprietary protocol. The protocol may be indicated by a field in the MAC header. When specialized routing equipment is used, IP could be replaced with MultiProtocol Label Switching (MPLS) or Virtual Private LAN Service (VPLS). Rather than encapsulate frames, translation or re-mapping of addresses could be employed.

Various programming tools and languages may be used to implement the various software modules. For example, virtual-network configuration process 30 may be constructed as a web application using any of the popular application development frameworks such as Django, Ruby on Rails or PHP. Data structures such as tables can be implemented in a wide variety of ways with many variations, such as trees, sorted tables, databases, etc. Components such as central on-demand VN configuration server 120, virtual-network configuration process 30 could be implemented in a variety of ways. VN configuration controller 42, VN device driver shim 44, virtual network management daemon 46, etc. can be implemented in software, firmware, or hardware using modules, routines, programming objects, etc. Some components are optional such as job queue 36 and cloud stack 140. It should be understood that the actual implementation of on-demand VN configuration server 120 and the central management server can be completely different, such as in the form of a distributed system. Thus, FIG. 4 illustrates only one possible way of doing this.

While virtual-private-network (VPN) tunnels are not needed to implement virtual networks, VPN tunnels could be used as part of the physical network that virtual networks are overlaid upon. LAN bridges, proxies, and gateways could also be part of the routing paths of the underlying physical network. Various applications-programming interfaces (APIs) may be used.

While using VN device driver shim 44 is desirable for performance reasons, a user space driver derived from the standard Linux user space TUN or TAP drivers could replace VN device driver shim 44. The TAP driver is placed on top of network stack 48 and straddles both the user and kernel spaces. The TAP driver is useful for prototyping and quick development as well as simple debugging, but has poor performance since context switches are required for each IP packet.

While VN switch table 50 has been described as being in the kernel space, the table could be located in the user space. Likewise shim 44 could be in the user space rather than in the kernel space. Virtual network management daemon 46 may be implemented in the kernel or in the user space. VN device driver shim 44 could be loaded at initialization rather than later as described in FIG. 12A. The random MAC address could be created by VN configuration controller 42 and sent to the node, rather than as described in step 330 of FIG. 12B. Other modifications to the flow and processes are possible.

Some modules or components could be merged or split. For example, virtual network management daemon 46 and VN device driver shim 44 could be merged into a user or a kernel space component, or each could be divided into several smaller units. UDP or TCP ports do not have to be stored in the tables, but could be implicit or the same for all nodes. Other fields could be added, such as a protocol identifier field (UDP or TCP for example). The data produced by applications 122 (FIG. 5A) may be encapsulated into network packets. Each packet may have multiple headers, provided by different levels in the network stack. For example, user data may be broken into packet with a TCP header, each of which is wrapped into an IP packet with an IP header and finally into an Ethernet frame with its own header.

The use of on premises nodes is not a requirement. Virtual networks may be configured to connect nodes that are entirely off premises within cloud computing provider 108 or hosted server location 106, or between these locations.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A virtual network overlay system comprising:
   a virtual network (VN) configuration database for storing virtual network addresses and physical network addresses for a plurality of nodes in a virtual network, the virtual network overlaid upon a plurality of physical networks that include an Internet that routes data using a layer-3 Internet Protocol (IP) network address;
   a virtual-network configuration process, coupled to receive network-configuration requests from a client operated by a subscriber, for writing a new virtual network address and a new physical network address for a new node being added to the virtual network;
   wherein applications executing on the new node send data to other nodes in the plurality of nodes using the virtual network addresses and receive data from the virtual network addressed to the new virtual network address;
   a plurality of VN switch tables, wherein a VN switch table is stored on each node in the virtual network, the VN switch table storing entries for nodes on the virtual network, the entries storing a virtual network address and a physical network address for each node on the virtual network;
   a VN configuration controller, activated by the virtual-network configuration process when the VN configuration database is updated, the VN configuration controller sending updates of the VN configuration database to the plurality nodes in the virtual network;
   a plurality of virtual network management daemons running on the plurality of nodes of the virtual network, wherein a virtual network management daemon receives the updates from the VN configuration controller and writes the updates to the VN switch table;
   wherein each node in the plurality of nodes on the virtual network further comprises:
      a network stack that sends data to an application executing on the node when a virtual network address of an incoming packet matches a virtual network address of the node, and the network stack receives data from the application and sends the data to a virtual network address specified by the application;
      a network interface controller (NIC), coupled to a physical local-area network that routes data using a layer-2 physical network address, for receiving data matching a physical network address for the node, and for sending data to a physical network address, wherein the physical local-area network is connected to the Internet; and
      a VN device driver shim between the network stack and the NIC, the VN device driver shim intercepting data between the network stack and the NIC, the VN device driver shim intercepting a virtual network address from the network stack and encapsulating data with a physical network address sent to the NIC using the VN switch table,
   whereby data sent to virtual network addresses of the network stack are encapsulated using physical network addresses of the physical local-area network by the VN device driver shim looking up a translation in the VN switch table.

2. The virtual network overlay system of claim 1 wherein the virtual network is a virtual layer-2 network and the virtual network address is a layer-2 network addresses and the physical network address is a layer-3 network address; wherein the VN switch table stores layer-2 network virtual addresses and layer-3 physical network addresses, wherein layer-2 physical network addresses are generatable at a destination from layer-3 physical network addresses using Address Resolution Protocol (ARP).

3. The virtual network overlay system of claim 2 wherein the physical local-area network is an Ethernet network and the physical network address is a Media-Access-Controller (MAC) address.

4. The virtual network overlay system of claim 1 wherein the virtual network management daemon executes in a user space on each node in the virtual network; and wherein the VN device driver shim and the network stack execute in a kernel space on each node in the virtual network.

5. The virtual network overlay system of claim 1 wherein the virtual-network configuration process executes on a central on-demand VN configuration server that is accessed by the subscriber.

6. The virtual network overlay system of claim 1 wherein the nodes on the virtual network comprise:
   physical nodes located on a physical local-area network operated by the subscriber and not open to users from a general public;
   virtual-machine nodes located on an internal provider network operated by a cloud computing provider and open to users from the general public;
   wherein the virtual-machine nodes are created and destroyed directly by the subscriber without intervention of staff of the cloud computing provider in response to demand from the general public for access to applications by the subscriber;
   wherein the internal provider network and the physical local-area network are connected together by the Internet,
   wherein the virtual network spans public and private locations having physical nodes and virtual-machine nodes.

7. The virtual network overlay system of claim 1 wherein the virtual network is a fully meshed network with point-to-point communication of data between any two nodes in the virtual network.

8. The virtual network overlay system of claim 6 further comprising:
   a plurality of virtual networks, each virtual network for private use by a different subscriber in a plurality of subscribers, wherein the virtual-network configuration process configures the plurality of virtual networks by updating the VN configuration database in response to requests from the different subscribers;

a plurality of private physical local-area networks for each of the plurality of subscribers, the plurality of private physical local-area networks each being controlled by a subscriber with limited or no access by the general public;

wherein the internal provider network is coupled to virtual-machine nodes for the different subscribers, the internal provider network routing data over the Internet to the plurality of private physical local-area networks using overlaid virtual networks;

a payment module, coupled to the virtual-network configuration process and to the VN configuration database, for generating billing items for billing the subscribers for virtual networks overlaid upon the internal provider network of the cloud computing provider, whereby many virtual networks are overlaid on the internal provider network and billed by the cloud computing provider.

9. The virtual network overlay system of claim 1 further comprising:

a virtual layer-2 frame, sent from the network stack to the VN device driver shim, the virtual layer-2 frame comprising a virtual layer-2 header containing the virtual network address and a payload containing a virtual layer-3 header and a data payload;

a physical layer-2 frame generated by the VN device driver shim and sent to the NIC for transmission over the physical local-area network, the physical layer-2 frame comprising a physical layer-3 header and a physical layer-2 header and the virtual layer-2 frame, wherein the VN device driver shim generates the physical layer-2 frame from the virtual layer-2 frame.

10. The virtual network overlay system of claim 9 further comprising:

a User Datagram Protocol (UDP) header and an Internet Protocol (IP) header in the physical layer-2 header.

11. A method comprising:

storing in a configuration database virtual network addresses and physical network addresses for a plurality of nodes in a virtual network, the virtual network overlaid upon a plurality of physical networks that include an Internet that routes data using a layer-3 Internet Protocol (IP) network address;

receiving network-configuration requests from a client operated by a subscriber, for writing a new virtual network address and a new physical network address for a new node being added to the virtual network, wherein applications executing on the new node send data to other nodes in the plurality of nodes using the virtual network addresses and receive data from the virtual network addressed to the new virtual network address;

storing in a virtual network switch table on each node entries for nodes in the virtual network, the entries including a virtual network address and a physical network address for each node on the virtual network;

sending updates of the configuration database from a configuration controller to the plurality of nodes in the virtual network when the configuration database is updated;

at a virtual network management daemon running on each of the plurality of nodes, receiving the updates from the configuration controller and writing the updates to the virtual network switch table at the corresponding node;

at a node among the plurality of nodes:

sending data, from a network stack, to an application executing on the node when a virtual network address of an incoming packet matches a virtual network address of the node, and the network stack receives data from the application and sends the data to a virtual network address specified by the application;

receiving, at a network interface controller, data matching a physical network address for the node and sending data to the physical network address; and intercepting, with a virtual network device driver shim, a virtual network address from the network stack and encapsulating data with a physical network address sent to the network interface controller using the virtual network switch table such that data sent to virtual network addresses of the network stack are encapsulated using physical network addresses of a physical local-area network that routes data using a layer-2 physical network address by the virtual network device driver shim looking up a translation in the virtual network switch table, wherein the physical local-area network is connected to the Internet.

12. The method of claim 11, wherein the nodes on the virtual network comprise physical nodes located on a physical local-area network operated by the subscriber and not publicly open to users, and virtual-machine nodes located on an internal provider network operated by a cloud computing provider and open to users from the general public.

13. The method of claim 12, further comprising creating and destroying virtual-machine nodes without intervention of the cloud computing provider in response to demand for access to applications by the subscriber.

14. The method of claim 11, wherein the virtual network is a virtual layer-2 network and the virtual network address is a layer-2 network addresses and the physical network address is a layer-3 network address, further comprising:

storing in the virtual network switch table layer-2 network virtual addresses and layer-3 physical network addresses, wherein layer-2 physical network addresses are generated at a destination from layer-3 physical network addresses using Address Resolution Protocol (ARP).

15. An apparatus comprising:

a network interface controller (NIC), coupled to a physical local-area network that routes data using a layer-2 physical network address, configured to receive data matching a physical network address from a node in a virtual network overlaid upon a plurality of physical networks that include an Internet that routes data using a layer-3 Internet Protocol (IP) network address, and for sending data to a physical network address;

memory configured to store a virtual network switch table containing entries for nodes on the virtual network, the entries including a virtual network address and a physical network address for each node on the virtual network;

a processor coupled to the NIC and the memory, and configured to execute:

a network stack configure to send data to an application executing on the node when a virtual network address of an incoming packet matches a virtual network address of the node, to receive data from the application and sends the data to a virtual network address specified by the application; and a device driver shim that intercepts a virtual network address from the network stack and encapsulate packets using physical network addresses of the physical local-area network using the VN switch table to retrieve physical network addresses from corresponding virtual network addresses of the packets.

16. The apparatus of claim 15, wherein the virtual network is a virtual layer-2 network and the virtual network address is a layer-2 network addresses and the physical network address is a layer-3 network address, and wherein the VN switch table stores layer-2 network virtual addresses and layer-3 physical network addresses, wherein layer-2 physical network addresses are generated at a destination from layer-3 physical network addresses.

17. The apparatus of claim 15, wherein the processor executes the device driver shim and the network stack in a kernel space on the node.

18. The apparatus of claim 15, wherein the processor is further configured to:
 couple a virtual layer-2 frame from the network stack to the device driver shim, the virtual layer-2 frame comprising a virtual layer-2 header containing the virtual network address and a payload containing a virtual layer-3 header and a data payload; and
 generate a physical layer-2 frame with the device driver shim from the virtual layer-2 frame, and couple the physical layer-2 frame to the NIC for transmission over the physical local-area network, the physical layer-2 frame comprising a physical layer-3 header and a physical layer-2 header and the virtual layer-2 frame.

19. The system of claim 1, wherein each of the virtual network management daemons running on the plurality of nodes of the virtual network receives a particular update from the VN configuration controller and writes the particular update to the VN switch table without a specific authorization for the particular update.

20. The method of claim 11, wherein the virtual network management daemon running on each of the plurality of nodes receives a particular update from the configuration controller and writes the particular update to the virtual network switch table without a specific authorization for the particular update.

21. The apparatus of claim 15, wherein the processor is further configured to receive a particular update from a configuration controller and write the particular update to the virtual network switch table without a specific authorization for the particular update.

* * * * *